United States Patent
Moriya et al.

(10) Patent No.: US 7,367,318 B2
(45) Date of Patent: May 6, 2008

(54) CONTROL SYSTEM AND CONTROL METHOD OF INTERNAL COMBUSTION ENGINE

(75) Inventors: Hidenori Moriya, Susono (JP); Ryusuke Ogino, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 10/582,226

(22) PCT Filed: Oct. 7, 2005

(86) PCT No.: PCT/JP2005/018907

§ 371 (c)(1),
(2), (4) Date: Jun. 8, 2006

(87) PCT Pub. No.: WO2006/038737

PCT Pub. Date: Apr. 13, 2006

(65) Prior Publication Data

US 2007/0113827 A1    May 24, 2007

(30) Foreign Application Priority Data

Oct. 7, 2004   (JP)   ............... 2004-295090
Aug. 19, 2005  (JP)   ............... 2005-238999

(51) Int. Cl.
  *F02M 7/00*    (2006.01)
  *F02M 25/07*   (2006.01)
  *F01L 1/34*    (2006.01)
  *G06F 17/00*   (2006.01)

(52) U.S. Cl. ............. 123/435; 123/568.14; 123/90.15; 701/103

(58) Field of Classification Search ........... 701/103, 701/104, 108, 110, 111, 114, 115; 123/90.15, 123/568.11, 568.14, 435
See application file for complete search history.

(56) References Cited

U.S. PATENT DOCUMENTS 4,967,711 A   11/1990  Morikawa et al.
6,840,235 B2  1/2005   Koseki et al.

(Continued)

FOREIGN PATENT DOCUMENTS

JP    A-02-040054    2/1990

(Continued)

*Primary Examiner*—Carl S. Miller
*Assistant Examiner*—Arnold Castro
(74) *Attorney, Agent, or Firm*—Oliff & Berridge, PLC

(57) ABSTRACT

An internal combustion engine (1) provided with a valve mechanism (VM) able to change a valve opening characteristic of at least one of an intake valve (Vi) and exhaust valve (Ve), a cylinder pressure sensor (15) for detecting a cylinder pressure in a combustion chamber (3), and an ECU (20), wherein the ECU (20) calculates the amount of air sucked into the combustion chamber (3) based on an intake air pressure during valve overlap between the intake valve (Vi) and the exhaust valve (Ve), the exhaust gas pressure during valve overlap, a cylinder pressure during the compression stroke detected by a cylinder sensor (15), and a gas passage effective area during valve overlap.

11 Claims, 10 Drawing Sheets

U.S. PATENT DOCUMENTS

| | | |
|---|---|---|
| 6,912,995 B2 * | 7/2005 | Miura .................... 123/435 |
| 7,003,390 B2 * | 2/2006 | Kaga ..................... 701/101 |
| 7,107,140 B2 * | 9/2006 | Yoshino et al. ........... 701/102 |
| 7,151,994 B2 * | 12/2006 | Fuwa ..................... 701/114 |
| 7,181,336 B2 * | 2/2007 | Muto et al. .............. 701/108 |
| 2004/0117104 A1 * | 6/2004 | Muto et al. .............. 701/108 |
| 2004/0139949 A1 | 7/2004 | Koseki et al. |
| 2004/0220718 A1 * | 11/2004 | Uchida et al. ............ 701/108 |
| 2005/0039723 A1 * | 2/2005 | Miura .................... 123/435 |
| 2005/0065707 A1 * | 3/2005 | Kaga ..................... 701/103 |
| 2005/0216179 A1 * | 9/2005 | Yasui et al. .............. 701/115 |
| 2006/0047406 A1 * | 3/2006 | Chatfield et al. .......... 701/104 |
| 2006/0161333 A1 * | 7/2006 | Muto et al. .............. 701/108 |

FOREIGN PATENT DOCUMENTS

| | | |
|---|---|---|
| JP | A-2003-184613 | 7/2003 |
| JP | A-2004-108262 | 4/2004 |
| JP | A-2004-278359 | 10/2004 |
| JP | A-2005-307847 | 11/2005 |

* cited by examiner

CONTROL SYSTEM AND CONTROL METHOD OF INTERNAL COMBUSTION ENGINE

TECHNICAL FIELD

The present invention relates to a control system and control method of an internal combustion engine burning an air-fuel mixture comprised of fuel and air inside a combustion chamber to generate power, more particularly relates to a control system and control method of an internal combustion engine having a valve mechanism able to change a valve opening characteristic of at least one of an intake valve and exhaust valve.

BACKGROUND ART

In the past, a control system of an internal combustion engine provided with a means for calculating the amount of change of cylinder pressure between immediately after closing of the intake valve and immediately before ignition based on a cylinder pressure, crank angle, and throttle opening degree and a means for calculating the amount of intake air from the amount of change of the cylinder pressure and an engine speed has been known (for example, see Japanese Patent Publication (A) No. 2-40054). Further, in the past, an internal combustion engine able to set valve overlap for making an intake valve and exhaust valve simultaneously open for improving the output or efficiency and reducing emissions has been known in the past. Further, as this type of internal combustion engine, an engine provided with a control system able to calculate the amount of gas remaining in a combustion chamber (amount of internal EGR) due to the valve overlap between the intake valve and exhaust valve has been known (for example, see Japanese Patent Publication (A) No. 2004-108262).

The control system described in Japanese Patent Publication (A) No. 2004-108262 calculates the cylinder temperature and cylinder pressure based on signals from an exhaust temperature sensor, intake pressure sensor, and exhaust pressure sensor at the time of closing of the exhaust valve, calculates the gas constant of the exhaust gas in accordance with the burned air-fuel ratio, and calculates the amount of cylinder gas at the time of closing of the exhaust valve based on the cylinder temperature, cylinder pressure, and gas constant. Further, this control system calculates the amount of blowback gas during overlap between the intake valve and exhaust valve based on signals from a crank angle sensor, water temperature sensor, cam angle sensor, and accelerator opening degree sensor and calculates the amount of gas remaining in a combustion chamber (amount of internal EGR) due to the valve overlap based on the amount of cylinder gas and the amount of blowback gas.

DISCLOSURE OF THE INVENTION

As explained above, according to a conventional control system, it is possible to calculate the amount of intake air and the amount of residual gas (amount of internal EGR) when the valve overlap of the internal combustion engine is set. However, in the conventional example, calculation of the amount of intake air or amount of residual gas requires a large number of parameters. For this reason, in a conventional internal combustion engine, to obtain these parameters, a large number of sensors are required and an increase in cost is forced.

Therefore, the present invention provides a practical control system and control method of an internal combustion engine able to precisely calculate the amount of air sucked into the combustion chamber at a low cost even when valve overlap between the intake valve and exhaust valve is set.

A control system of an internal combustion engine according to the present invention is a control system of an internal combustion engine having a valve mechanism able to change a valve opening characteristic of at least one of an intake valve and exhaust valve and burning an air-fuel mixture comprised of fuel and air inside a combustion chamber to generate power, characterized by being provided with a cylinder pressure detecting means for detecting a cylinder pressure at the combustion chamber and an intake air calculating means for calculating the amount of air sucked into the combustion chamber based on an intake air pressure during valve overlap between the intake valve and the exhaust valve, an exhaust gas pressure during valve overlap, a cylinder pressure during a compression stroke detected by the cylinder pressure detecting means, and a gas passage effective area during the valve overlap.

Note that, preferably, the exhaust gas pressure during valve overlap is estimated based on the cylinder pressure detected by the cylinder pressure detecting means before or at the start of valve overlap.

Further, preferably, the exhaust gas pressure during valve overlap is estimated also based on the load of the internal combustion engine.

Further, preferably, when a load of the internal combustion engine is higher than a predetermined load, the exhaust gas pressure during valve overlap is estimated to be higher than the cylinder pressure detected by the cylinder pressure detecting means before or at the start of valve overlap.

Further, preferably, the internal combustion engine has a plurality of combustion chambers and is provided with the cylinder pressure detecting means for each combustion chamber and the intake air pressure during the valve overlap in any combustion chamber is estimated based on the cylinder pressure at intake bottom dead center of another combustion chamber where the intake stroke was executed before that combustion chamber.

Further, preferably, the system is further provided with a second intake air calculating means for calculating the amount of air sucked into the combustion chamber by a different technique from the intake air calculating means forming the first intake air calculating means and calculates the amount of air sucked into the combustion chamber used for control of the internal combustion engine based on the amount of air sucked into the combustion chamber calculated by the first intake air calculating means and the amount of air sucked into the combustion chamber calculated by the second intake air calculating means.

Further, preferably, the amount of air sucked into the combustion chamber in the current cycle calculated by the second intake air calculating means is corrected based on the amount of air sucked into the combustion chamber in the previous cycle calculated by the first intake air calculating means so as to calculate the amount of air sucked into the combustion chamber in the current cycle.

Further, the amount of air sucked into the combustion chamber in the current cycle calculated by the second intake air calculating means is corrected based on the difference between the amount of air sucked into the combustion chamber in the previous cycle calculated by the first intake air calculating means and the amount of air sucked into the combustion chamber in the previous cycle calculated by the second intake air calculating means so as to calculate the amount of air sucked into the combustion chamber in the current cycle.

Further, preferably, when the difference between the amount of air sucked into the combustion chamber in the previous cycle calculated by the first intake air calculating means and the amount of air sucked into the combustion chamber in the previous cycle calculated by the second intake air calculating means is a predetermined value or more, correcting the amount of air sucked into the combustion chamber in the current cycle, calculated by the second intake air calculating means based on the difference so as to calculate the amount of air sucked into the combustion chamber in the current cycle, is prohibited.

Further, preferably, the gas passage effective area is calculated based on the lift amounts of the intake valve and exhaust valve during the valve overlap and the engine speed during the valve overlap.

The control method of an internal combustion engine according to the present invention is a control method of an internal combustion engine having a valve mechanism able to change a valve opening characteristic of at least one of an intake valve and exhaust valve and burning an air-fuel mixture comprised of fuel and air inside a combustion chamber to generate power, characterized by calculating the amount of air sucked into the combustion chamber based on an intake air pressure during valve overlap between the intake valve and the exhaust valve, an exhaust gas pressure during valve overlap, a cylinder pressure at the combustion chamber during a compression stroke of the internal combustion engine, and a gas passage effective area during the valve overlap.

According to the present invention, it becomes possible to realize a practical control system and control method of an internal combustion engine able to precisely calculate the amount of air sucked into a combustion chamber at a low cost.

Below, the present invention will be able to be understood more fully from the attached drawings and preferred embodiments of the present invention.

BEST MODE FOR WORKING THE INVENTION

Figure 1:
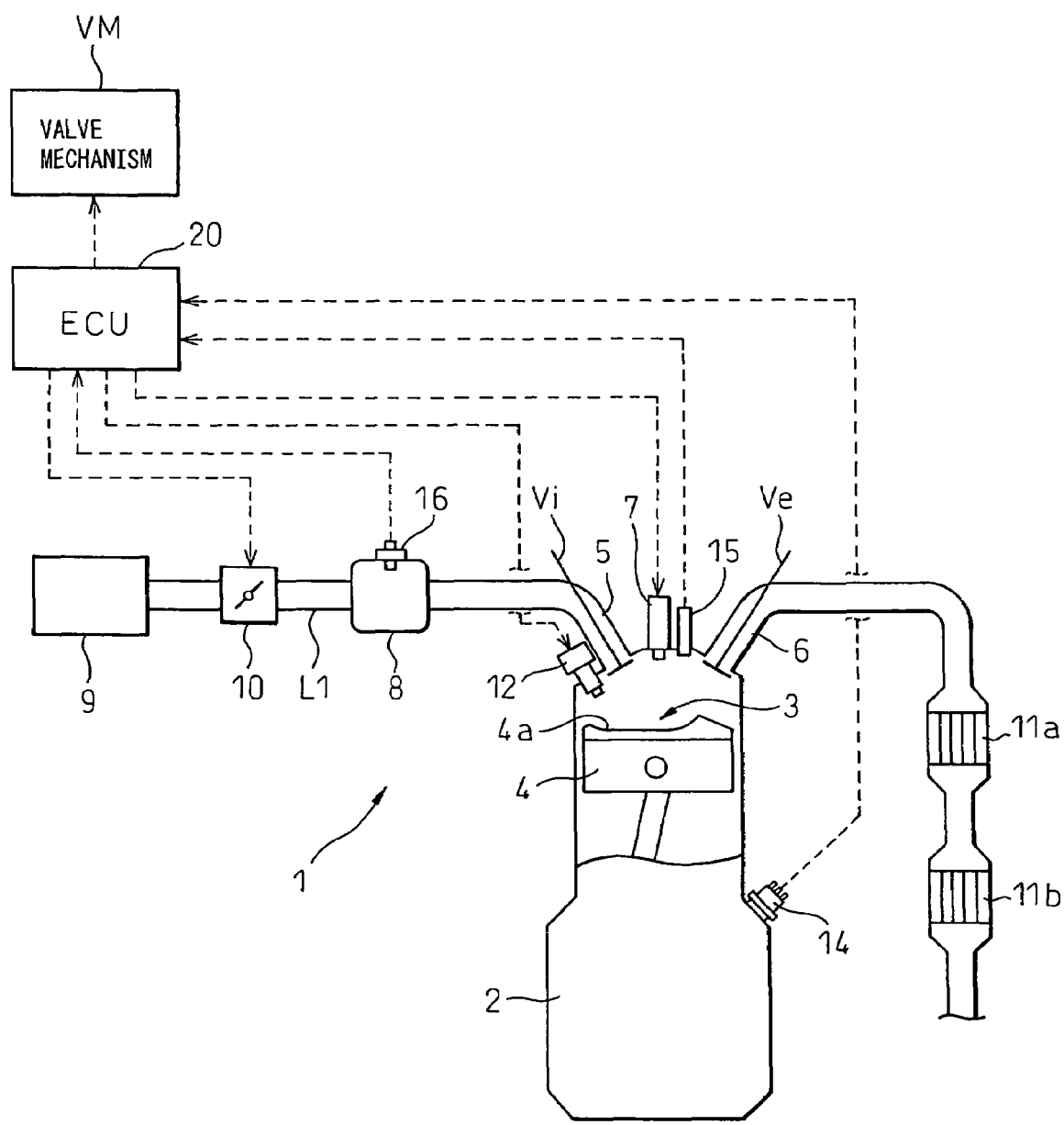
FIG. 1 is a schematic view of the configuration of an internal combustion engine to which the control system according to the present invention is applied.

A control system of an internal combustion engine according to the present invention calculates an amount of change of cylinder pressure due to valve overlap when valve overlap between an intake valve and exhaust valve is set and calculates an amount of air sucked into a combustion chamber based on the amount of change of this cylinder pressure and the cylinder pressure detected by a cylinder pressure detecting means at a predetermined timing.

Here, an amount of residual gas Me remaining in the combustion chamber due to the valve overlap when valve overlap between the intake valve and exhaust valve is set is expressed by the following equation (1) when an intake air pressure at a predetermined timing during valve overlap (timing when crank angle becomes $\theta_1$) is $Pm(\theta_1)$, an exhaust gas pressure at the predetermined timing is $Pe(\theta_1)$, a temperature of the exhaust gas at that time is Te, and a gas constant is $R(J/(kg \cdot K))$, $$Me = S \cdot \phi(Pm(\theta_1)/Pe(\theta_1)) \cdot Pe(\theta_1)/\sqrt{R \cdot Te} \quad (1)$$

In the equation (1), S is an effective area allowing passage of gas during valve overlap, that is, a gas passage effective area. The gas passage effective area S is expressed by the following equation (2). In equation (2), $Ne(\theta_1)$ is an engine speed at the timing when the crank angle becomes $\theta_1$. Further, Ri is a valve diameter of an intake valve Vi, Re is a valve diameter of an exhaust valve Ve, $Li(\theta)$ is an amount of lift of the intake valve Vi, $Le(\theta)$ is an amount of lift of the exhaust valve Ve, IVO is a crank angle at the timing of opening of the intake valve Vi, and EVC is a crank angle at the timing of closing of the exhaust valve Ve. Further, in the equation (2), the value obtained by integrating the $\sqrt{Li(\theta) \cdot Le(\theta)}$ from IVO to EVC (i.e. $\int \sqrt{Li(\theta) \cdot Le(\theta)} d\theta$) is the value determined in accordance with the amount of advance (VVT advance) of the variable valve timing mechanism.

Further, in the equation (1), $\phi(Pm(\theta_1)/Pe(\theta_1))$ is a term related to the ratio between the intake air pressure and the exhaust gas pressure and is basically expressed by the following equation (3). When the value of $Pm(\theta_1)/Pe(\theta_1)$ is small, it is expressed by the following equation (4). However, in the equation (3) and equation (4), $\kappa$ is the specific heat ratio.

$$S = \pi \sqrt{Ri \cdot Re} \cdot \cos(45°) \cdot \int_{IVO}^{EVC} \sqrt{Li(\theta) \cdot Le(\theta)} \, d\theta \cdot (60/Ne(\theta_1)/360) \quad (2)$$

$$\phi\left(\frac{Pm(\theta_1)}{Pe(\theta_1)}\right) = \sqrt{\frac{2\kappa}{\kappa-1} \cdot \left\{\frac{\left(\frac{Pm(\theta_1)}{Pe(\theta_1)}\right)^{\frac{2}{\kappa}} -}{\left(\frac{Pm(\theta_1)}{Pe(\theta_1)}\right)^{\frac{\kappa+1}{\kappa}}}\right\}} \quad \ldots \frac{Pm(\theta_1)}{Pe(\theta_1)} \geq \left(\frac{2}{\kappa+1}\right)^{\frac{\kappa}{\kappa-1}} \quad (3)$$

$$\phi\left(\frac{Pm(\theta_1)}{Pe(\theta_1)}\right) = \sqrt{\kappa \cdot \left(\frac{2\kappa}{\kappa+1}\right)^{\frac{\kappa+1}{\kappa-1}}} \quad \ldots \frac{Pm(\theta_1)}{Pe(\theta_1)} < \left(\frac{2}{\kappa+1}\right)^{\frac{\kappa}{\kappa-1}} \quad (4)$$

On the other hand, between the amount of residual gas Me remaining in the combustion chamber due to the valve overlap and the amount of change $\Delta Pc$ of the cylinder pressure due to the valve overlap, in general the relationship of the following equation (5) stands. Due to this, from the equation (1) and equation (5), the amount of change $\Delta Pc$ of the cylinder pressure is expressed as in the following equation (6) based on the amount of residual gas Me remaining in the combustion chamber due to the valve overlap. In equation (6), $\alpha$ is a constant determined based on experiments etc. Further, from the amount of change $\Delta Pc$ of this cylinder pressure and the cylinder pressure Pc ($\theta_2$) detected by the cylinder pressure detecting means at a predetermined timing during the compression stroke (timing when the crank angle becomes $\theta_2$, timing after intake valve closing and before start of combustion (before spark ignition or before compression ignition)), the amount of air sucked into the combustion chamber $M_{air}$ can be expressed by the following equation (7). However, in equation (7), $\beta$ is a constant determined based on experiments etc.

$$\Delta Pc \propto Me \cdot \sqrt{Te} \quad (5)$$

$$\Delta Pc = \alpha \cdot S \cdot \phi(Pm(\theta_1)/Pe(\theta_1)) \cdot Pe(\theta_1) \quad (6)$$

$$M_{air} = \beta \cdot (Pc(\theta_2) - \Delta Pc) \quad (7)$$

Therefore, as executed by a control system of an internal combustion engine according to the present invention, if obtaining the intake air pressure $Pm(\theta_1)$, exhaust gas pressure $Pe(\theta_1)$, and engine speed $Ne(\theta_1)$ at a predetermined timing during valve overlap and the cylinder pressure $Pc(\theta_2)$ detected at a predetermined timing, it is possible to calculate the amount of air sucked into the combustion chamber at a low cost and good precision without using a large number of sensors.

Further, as explained above, when calculating the amount of change $\Delta Pc$ of the cylinder pressure due to the valve overlap based on the intake air pressure $Pm(\theta_1)$ and exhaust gas pressure $Pe(\theta_1)$ during valve overlap, the exhaust gas pressure $Pe(\theta_1)$ is preferably estimated based on the cylinder pressure detected by the cylinder pressure detecting means $Pc(\theta_0)$ immediately before or at the start of valve overlap (at the timing when the crank angle becomes $\theta_0$).

That is, the exhaust gas pressure before opening the intake valve for valve overlap or at the time of opening of the intake valve generally matches the cylinder pressure. If the load of the internal combustion engine is not that large, the change in exhaust gas pressure before and after opening of the intake valve for the valve overlap, is small. Therefore, the exhaust gas pressure $Pe(\theta_1)$ during valve overlap can be estimated based on the cylinder pressure $Pc(\theta_0)$ detected by the cylinder pressure detecting means before or at the start of valve overlap. If at the time of low load of the internal combustion engine, for example, $Pe(\theta_1)$ may be assumed to be $Pc(\theta_0)$. Due to this, a sensor for detecting the pressure of the exhaust gas becomes unnecessary, so it becomes possible to reduce the cost required for calculation of the amount of air sucked into the combustion chamber.

On the other hand, if the load of the internal combustion engine rises to a certain extent, due to the effects of exhaust pulsation etc., the change in the exhaust gas pressure during valve overlap becomes larger and replacement of the exhaust gas pressure $Pe(\theta_1)$ during valve overlap by the cylinder pressure $Pc(\theta_0)$ detected by the cylinder pressure detecting means before or at the start of valve overlap becomes difficult.

That is, until the load of the internal combustion engine rises to a certain extent, the ratio between the intake air pressure $Pm(\theta_1)$ and the exhaust gas pressure $Pe(\theta_1)$ during valve overlap entered for the function $\phi$ of the equation (3) generally matches with the ratio of the intake air pressure $Pm(\theta_1)$ during valve overlap and the cylinder pressure $Pc(\theta_0)$ detected before or at the start of valve overlap. The values of the two increase along with a rise in the load. As opposed to this, if the ratio between the intake air pressure $Pm(\theta_1)$ and the cylinder pressure $Pc(\theta_0)$ rises above a predetermined value $\epsilon$ determined by experiments or experience, the correlation $Pm(\theta_1)/Pe(\theta_1)=Pm(\theta_1)/Pc(\theta_0)$ no longer stands.

For this reason, when the ratio between the intake air pressure $Pm(\theta_1)$ and cylinder pressure $Pc(\theta_0)$ exceeds a predetermined value $\epsilon$, the ratio between the intake air pressure $Pm(\theta_1)$ and exhaust gas pressure $Pe(\theta_1)$ during valve overlap is assumed to be fixed at a predetermined value $\epsilon$, the exhaust gas pressure $Pe(\theta_1)$ during valve overlap is preferably determined based on the intake air pressure $Pm(\theta_1)$ during valve overlap and the predetermined value $\epsilon$ as $Pe(\theta_1)=Pm(\theta_1)/\epsilon$. Due to this, when the exhaust gas pressure during valve overlap is not actually measured, even if the load of the internal combustion engine rises, the amount of air sucked into the combustion chamber can be calculated precisely without effect due to the change in the exhaust gas pressure accompanying valve overlap.

Further, in an internal combustion engine having a plurality of combustion chambers, a cylinder pressure detecting means may be provided for each combustion chamber. In this case, preferably the amount of change $\Delta Pc$ of the cylinder pressure is calculated for each combustion chamber and the amount of air sucked into each combustion chamber is calculated based on the amount of change $\Delta Pc$ of the cylinder pressure in each combustion chamber and the cylinder pressure $Pc(\theta_2)$ in each combustion chamber detected by each cylinder pressure detecting means at a predetermined timing. Due to this, it is possible to obtain a precise grasp of the variations in the amount of intake air between combustion chambers, so it is possible to improve the precision of control of the air-fuel ratio etc. in each combustion chamber.

Further, the intake air pressure during valve overlap in any combustion chamber may be estimated based on the cylinder pressure at intake bottom dead center of another combustion chamber where the intake stroke was executed before the combustion chamber.

In general, the intake air pressure and cylinder pressure becomes generally the same at intake bottom dead center. Further, the timing when valve overlap is executed at a certain combustion chamber generally matches with the timing when the intake bottom dead center arrives in another combustion chamber where the intake stroke is executed 1/N cycle before the combustion chamber (where the four strokes of intake, compression, expansion, and exhaust are designated as 1 cycle and N indicates the number of cylinders). Therefore, by estimating the intake air pressure based on the cylinder pressure, the sensor for detecting the intake air pressure becomes unnecessary and the cost of calculating the amount of air sucked into each combustion chamber can be reduced much more.

Below, the drawings will be referred to so as to explain the best mode for working the present invention in detail.

FIG. 1 is a schematic view of the configuration showing an internal combustion engine to which the control system according to the present invention is applied. The internal combustion engine 1 shown in the figure is one which burns an air-fuel mixture comprised of fuel and air inside a combustion chamber 3 formed in a cylinder block 2 to make a piston 4 move back and forth in the combustion chamber 3 and thereby generate power. The internal combustion engine 1 is preferably configured as a multicylinder engine. The internal combustion engine 1 of the present embodiment is configured as for example a four-cylinder engine.

The intake port of each combustion chamber 3 is connected to an intake pipe (intake manifold) 5, while the exhaust port of each combustion chamber 3 is connected to an exhaust pipe 6 (exhaust manifold). Further, the cylinder head of the internal combustion engine 1 is provided with an intake valve Vi and exhaust valve Ve for each combustion chamber 3. Each intake valve Vi opens/closes a corresponding intake port, while each exhaust valve Ve opens/closes a corresponding exhaust port. Each intake valve Vi and each exhaust valve Ve is opened/closed by a valve mechanism VM including a variable valve timing mechanism. Further, the internal combustion engine 1 has a number of spark plugs 7 corresponding to the number of cylinders. Each spark plug 7 is provided at the cylinder head to approach the inside of the corresponding combustion chamber 3.

The intake pipe 5, as shown in FIG. 1, is connected to the surge tank 8. The surge tank 8 has an air feed line L1 connected to it. The air feed line L1 is connected through an air cleaner 9 to a not shown air intake port. Further, in the middle of the air feed line L1 (between the surge tank 8 and air cleaner 9), a throttle valve (in the present embodiment, an electronic control type throttle valve) 10 is installed. On the other hand, the exhaust pipe 6, as shown in FIG. 1, has a front-end catalyst device 11a including, for example, a three-way catalyst and a back-end catalyst device 11b including, for example, a NOx storing and reducing catalyst, connected to it.

Further, the internal combustion engine 1 has a plurality of injectors 12. Each injector 12, as shown in FIG. 1, is arranged at the cylinder head to approach the inside of the corresponding combustion chamber 3. Further, each piston 4 of the internal combustion engine 1 is configured by a recessed top face type which has a recess 4a on its top face. Further, in the internal combustion engine 1, in the state with air sucked into each combustion chamber 3, each injector 12 directly injects gasoline or other fuel toward the recess 4a of the piston 4 in each combustion chamber 3.

Due to this, in the internal combustion engine 1, a layer of the air-fuel mixture comprised of the fuel and air is formed near the spark plug 7 in a state separated from the surrounding air layer (stratification), so it is possible to use an extremely lean air-fuel mixture for execution of stable stratified combustion. Note that the internal combustion engine 1 of the present embodiment is explained as a so-called direct injection engine, but is not limited to this. The present invention may also be applied to an intake pipe (intake port) injection type internal combustion engine as a matter of course.

The above-mentioned spark plugs 7, throttle valves 10, injectors 12, valve mechanism VM, etc. are electrically connected to the ECU 20 functioning as the control system of the internal combustion engine 1. The ECU 20 includes, all not shown, a CPU, ROM, RAM, input/output ports, storage device, etc. The ECU 20, as shown in FIG. 1, has the crank angle sensor 14 of the internal combustion engine 1 and other various types of sensors electrically connected to it. The ECU 20 uses various types of maps etc. stored in the storage device and controls the spark plugs 7, throttle valves 10, injectors 12, valve mechanism VM, etc. so that the desired output is obtained based on the detection values of the various types of sensors etc.

Further, the internal combustion engine 1 has a number of cylinder pressure sensors including semiconductor devices, piezoelectric devices, piezomagnetic devices, or optical fiber detection devices, etc. (cylinder pressure detecting means) 15 corresponding to the number of cylinders. Each cylinder pressure sensor 15 is arranged at the cylinder head so that its pressure receiving face approaches the inside of the corresponding combustion chamber 3 and is electrically connected through a not shown A/D converter etc. to the ECU 20. Each cylinder pressure sensor 15 outputs a pressure applied to the pressure receiving face in the combustion chamber 3 (cylinder pressure) as a relative value with respect to the atmospheric pressure and gives a voltage signal corresponding to the pressure applied to the pressure receiving face (cylinder pressure) (signal showing the detection value) to the ECU 20.

Further, the internal combustion engine 1 has an intake pressure sensor 16 detecting the intake air pressure inside the surge tank 8 (intake pressure) as an absolute pressure. The intake pressure sensor 16 is also electrically connected, through a not shown A/D converter etc., to the ECU 20 and sends a signal showing the detected absolute pressure of the intake air in the surge tank 8 to the ECU 20. Note that detection values of the crank angle sensor 14 and the intake pressure sensor 16 are successively given every other incremental time interval to the ECU 20 and stored in a predetermined storage region (buffer) of the ECU 20 in predetermined amounts. Further, the detection value of each cylinder pressure sensor 15 (cylinder pressure) is corrected in absolute pressure based on the detection value of the intake pressure sensor 16 and stored in a predetermined storage region (buffer) of the ECU 20 in predetermined amounts.

Figure 2:
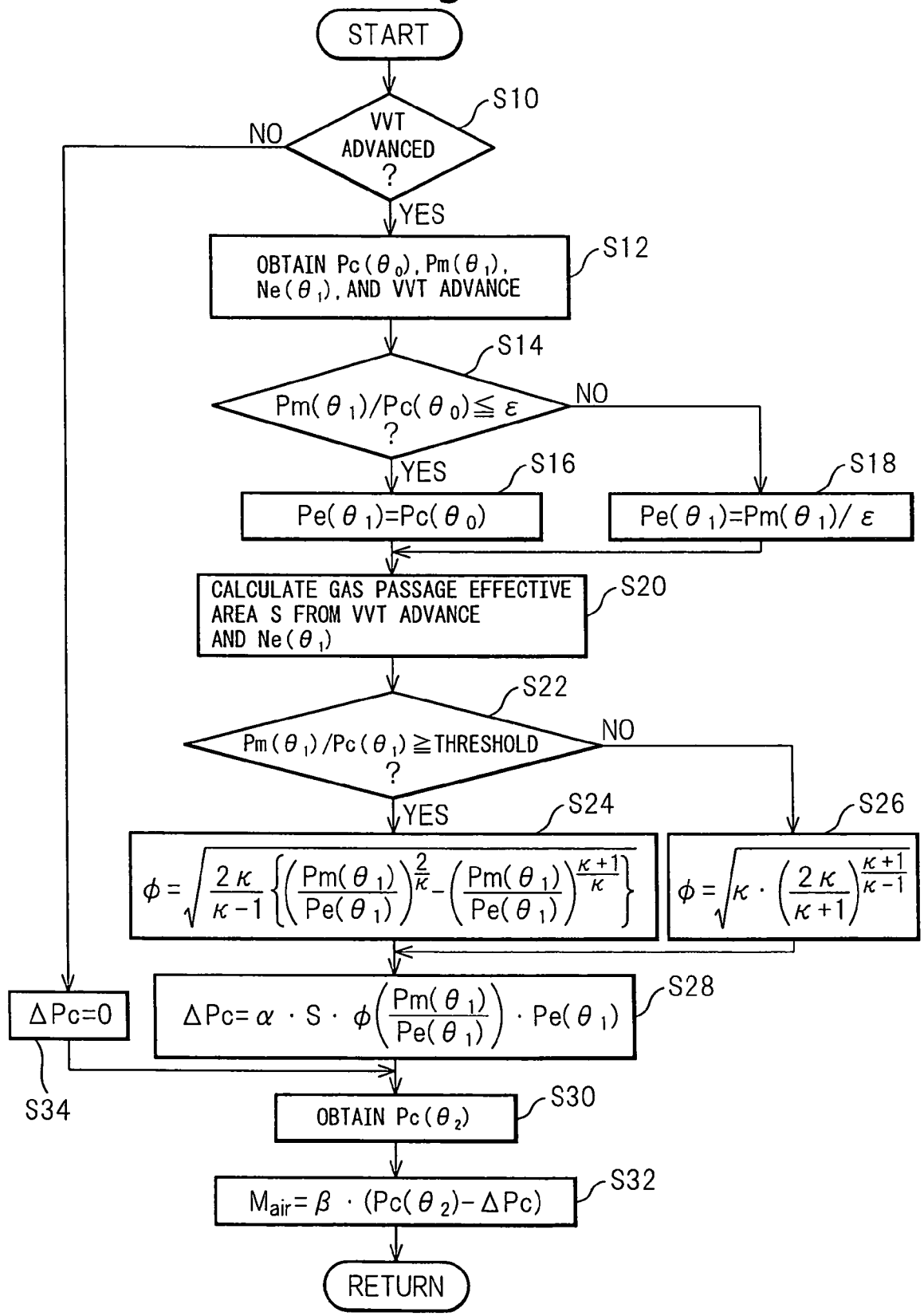
FIG. 2 is a flow chart for explaining an intake air amount calculation routine in the internal combustion engine of FIG. 1.

Next, referring to FIG. 2, the routine for calculating the amount of air sucked into each combustion chamber 3 in the above-mentioned internal combustion engine 1 will be explained. When the internal combustion engine 1 is started, the ECU 20 repeatedly executes the intake air calculation routine shown in FIG. 2 for each combustion chamber 3. The intake air calculation routine of FIG. 2 is basically for calculating the amount of air sucked into each combustion chamber 3 using equations (1) to (7). When the timing for execution of this routine arrives, the ECU 20 first judges if the valve opening timing of the intake valve Vi is advanced (S10).

When the ECU 20 judges at S10 that the valve opening timing of the intake valve Vi is advanced, the ECU 20 reads from the predetermined storage region the cylinder pressure $Pc(\theta_0)$ detected by the cylinder pressure sensor 15 at a predetermined timing immediately before or at the start of valve overlap between the intake valve Vi and exhaust valve Ve (timing when crank angle becomes $\theta_0$) for the combustion chamber 3 concerned and reads the intake air pressure $Pm(\theta_1)$ detected by the intake pressure sensor 16 at a predetermined timing during valve overlap between the intake valve Vi and exhaust valve Ve (timing when crank angle becomes $\theta_1$) (S12). Further, at S12, the ECU 20 finds the engine speed $Ne(\theta_1)$ at the timing when the crank angle becomes $\theta_1$ based on the detection value of the crank angle sensor 14 at a predetermined timing during valve overlap (timing where crank angle becomes $\theta_1$) and obtains the VVT advance at the timing when the crank angle becomes $\theta_1$ from the valve mechanism VM.

In the present embodiment, the predetermined timing immediately before or at the time of start of valve overlap between the intake valve Vi and the exhaust valve Ve is made the time of start of valve overlap, that is, the time of opening of the intake valve Vi, and is made the timing where the crank angle becomes, for example, $\theta_0$=BTDC20°. Further, the predetermined timing during valve overlap is made the timing when the crank angle becomes, for example, $\theta_1$=BTDC10° (exhaust BTDC10°). At S12, when it obtains the cylinder pressure $Pc(\theta_0)$ at the timing when the crank angle becomes $\theta_0$ and the intake air pressure $Pm(\theta_1)$ at the timing when the crank angle becomes $\theta_1$, the ECU 20 finds the value of the ratio $Pm(\theta_1)/Pc(\theta_0)$ between the intake air pressure $Pm(\theta_1)$ and cylinder pressure $Pc(\theta_0)$ for the combustion chamber 3 concerned and judges if the value of $Pm(\theta_1)/Pc(\theta_0)$ is a predetermined threshold value $\epsilon$ (in the present embodiment, $\epsilon$=0.95) or less (S14).

Figure 3:
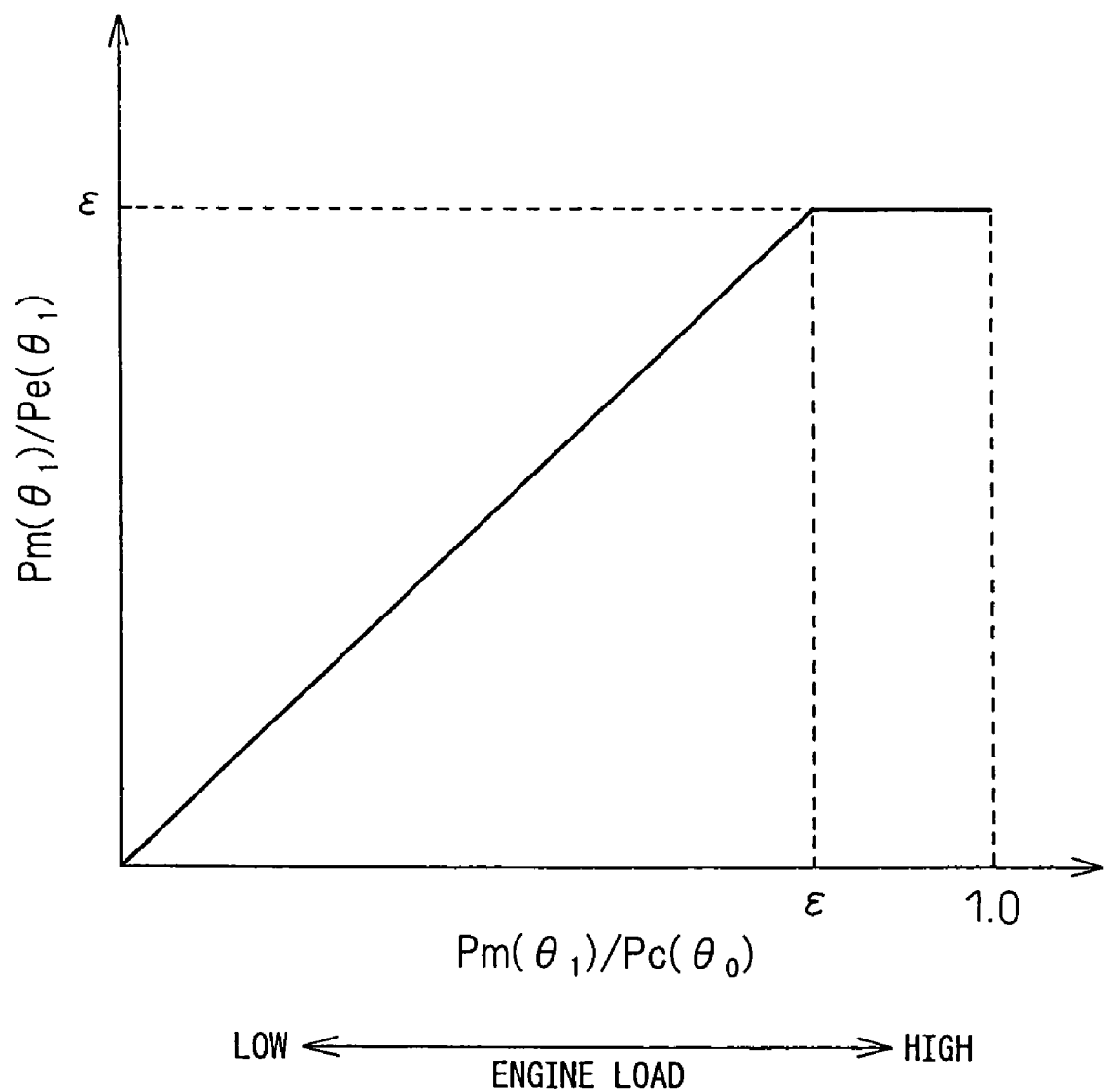
FIG. 3 is a graph illustrating the relationship between the ratio between intake air pressure at a predetermined timing during valve overlap and the cylinder pressure at a predetermined timing immediately before or at the start of valve overlap and the ratio between the intake air pressure and exhaust gas pressure, at a predetermined timing during valve overlap.

Here, between the ratio $Pm(\theta_1)/Pc(\theta_0)$ between the intake air pressure $Pm(\theta_1)$ and cylinder pressure $Pc(\theta_0)$ and the ratio $Pm(\theta_1)/Pe(\theta_1)$ between the intake air pressure $Pm(\theta_1)$ and the exhaust gas pressure $Pe(\theta_1)$, which is the parameter used in the equation (3), the relationship illustrated in FIG. 3 stands. That is, in the range where the load of the internal combustion engine 1 is not that large, the value of $Pm(\theta_1)/Pe(\theta_1)$ and the value of $Pm(\theta_1)/Pc(\theta_0)$ increase along with the rise in the load and the relationship $Pm(\theta_1)/Pe(\theta_1)=Pm(\theta_1)/Pc(\theta_0)$ holds.

That is, at the timing immediately before opening the intake valve Vi for valve overlap or at the time of opening, the exhaust gas pressure generally matches with the cylinder pressure. When the load of the internal combustion engine 1 is not that large, the change in exhaust gas pressure before and after opening the intake valve Vi for valve overlap is small. Therefore, in the range where the load of the internal combustion engine 1 is not that large, it is possible to estimate the exhaust gas pressure $Pe(\theta_1)$ during valve overlap, that is, at the timing when the crank angle becomes $\theta_1$, based on the cylinder pressure $Pc(\theta_0)$ detected by the cylinder pressure sensor 15 immediately before or at the start of valve overlap, that is, at the timing when the crank angle becomes $\theta_0$. It is possible to deem that $Pe(\theta_1)=Pc(\theta_0)$, $Pm(\theta_1)/Pe(\theta_1)=Pm(\theta_1)/Pc(\theta_0)$.

As opposed to this, if the load of the internal combustion engine 1 becomes higher by a certain extent, due to the effects of exhaust pulsation etc., the change in the exhaust gas pressure before and after opening the intake valve Vi for valve overlap becomes larger. That is, if the load of the internal combustion engine 1 becomes higher by a certain extent and the ratio $Pm(\theta_1)/Pc(\theta_0)$ between the intake air pressure $Pm(\theta_1)$ and the cylinder pressure $Pc(\theta_0)$ becomes the predetermined value $\epsilon$ or more, the correlation of $Pm(\theta_1)/Pe(\theta_1)=Pm(\theta_1)/Pc(\theta_0)$ no longer stands and replacement of the exhaust gas pressure $Pe(\theta_1)$ during valve overlap by the cylinder pressure $Pc(\theta_0)$ detected by the cylinder pressure detecting means immediately before or at the start of valve overlap becomes difficult.

Considering these points, in the internal combustion engine 1, when it is judged at S14 for each combustion chamber 3 that the value of $Pm(\theta_1)/Pc(\theta_0)$ is the threshold value $\epsilon$ or less, the exhaust gas pressure $Pe(\theta_1)$ during valve overlap is replaced by the cylinder pressure $Pc(\theta_0)$ detected by the cylinder pressure sensor 15 immediately before or at the start of valve overlap and $Pe(\theta_1)=Pc(\theta_0)$ is set by the ECU 20 (S16). Further, when it is judged at S14 for each combustion chamber 3 that the value of $Pm(\theta_1)/Pc(\theta_0)$ exceeds the threshold value $\epsilon$, the ECU 20 sets the exhaust gas pressure $Pe(\theta_1)$ during valve overlap using the predetermined value $\epsilon$ as $$Pe(\theta_1)=Pm(\theta_1)/\epsilon$$

(S18). That is, in the processing of S18, the ratio between the intake air pressure $Pm(\theta_1)$ and the exhaust gas pressure $Pe(\theta_1)$ during valve overlap is assumed to be fixed to the guard value constituted by the threshold value $\epsilon$ (in the present embodiment, 0.95) and the exhaust gas pressure $Pe(\theta_1)$ during valve overlap is set based on the intake air pressure $Pm(\theta_1)$ during valve overlap and the threshold value $\epsilon$.

If executing the processing of S16 or S18, the ECU 20 sets the value of $\int \sqrt{(Li(\theta) \cdot Le(\theta))} d\theta$ corresponding to the VVT advance obtained at S12 using a predetermined function equation or map and uses this value and the engine speed $Ne(\theta_1)$ obtained at S12 to calculate the gas passage effective area S from the equation (2) (S20). If finding the gas passage effective area S, the ECU 20 judges whether the value of the intake air pressure $Pm(\theta_1)$ obtained at S12 divided by the exhaust gas pressure $Pe(\theta_1)$ during valve overlap set at S16 or S18 is the threshold value $(2/(\kappa+1))^{\kappa/(\kappa-1)}$ or more (S22). In the present embodiment, as the threshold value $(2/(\kappa+1))^{\kappa/(\kappa-1)}$, for example a constant obtained as $\kappa$=1.32 is used.

As explained above, the equation expressing the $\phi(Pm(\theta_1)/Pe(\theta_1))$ required when calculating the amount of change $\Delta Pc$ of the cylinder pressure due to valve overlap changes in accordance with the value of $Pm(\theta_1)/Pe(\theta_1)$. For this reason, when the ECU 20 judges at S22 that the value of $Pm(\theta_1)/Pe(\theta_1)$ is the threshold value or more, it uses the equation (3) to calculate the value of $\phi(Pm(\theta_1)/Pe(\theta_1))$ (S24). Further, when the ECU 20 judges at S22 that the value of $Pm(\theta_1)/Pe(\theta_1)$ is lower than the threshold value, it uses the equation (4) to calculate the value of $\phi(Pm(\theta_1)/Pe(\theta_1))$ (S26).

When finding the gas passage effective area S at S20 and finding the value of $\phi(Pm(\theta_1)/Pe(\theta_1))$ at S24 or S26, the ECU 20 uses the equation (6) to calculate the amount of change $\Delta Pc$ of the cylinder pressure due to the valve overlap for the combustion chamber 3 concerned (S28). After the processing of S28, the ECU 20 reads from the predetermined storage region, for each combustion chamber 3 concerned, the cylinder pressure $Pc(\theta_2)$ detected by the cylinder pressure sensor 15 at the timing when the crank angle during the compression stroke becomes $\theta_2$ (S30). Note that, in the present embodiment, the predetermined timing during the compression stroke is made the timing when the crank angle becomes for example $\theta_2$=BTDC50° (compression BTDC50°).

Further, the ECU 20 uses the equation (7) to calculate the amount of intake air $M_{air}$ for the combustion chamber 3 concerned from the amount of change $\Delta Pc$ of the cylinder pressure found at S28 and the cylinder pressure $Pc(\theta_2)$ obtained at S30 (S32). In this way, in the internal combustion engine 1, by obtaining the intake air pressure $Pm(\theta_1)$ and exhaust gas pressure $Pe(\theta_1)$ and engine speed $Ne(\theta_1)$ at a predetermined timing during valve overlap and the cylinder pressure $Pc(\theta_2)$ detected at a predetermined timing, it is possible to precisely calculate the amount of air sucked into each combustion chamber 3 at a low cost without using a large number of sensors.

Further, in the internal combustion engine 1, when the load is relatively low and it is judged at S14 that the value of $Pm(\theta_1)/Pc(\theta_0)$ is the threshold value $\epsilon$ or less, the exhaust gas pressure $Pe(\theta_1)$ during valve overlap is replaced by the cylinder pressure $Pc(\theta_0)$ detected by the cylinder pressure sensor 15 immediately before or at the start of valve overlap. Due to this, the sensor for measuring the exhaust gas pressure becomes unnecessary, so the cost required for calculating the amount of air sucked into each combustion chamber 3 can be reduced.

Further, in an internal combustion engine 1 from which a sensor for measuring the exhaust gas pressure is omitted, when the load rises and it is judged at S14 that the value of $Pm(\theta_1)/Pc(\theta_0)$ exceeds a threshold value $\epsilon$, if it is assumed that the ratio between the intake air pressure $Pm(\theta_1)$ and exhaust gas pressure $Pe(\theta_1)$ during valve overlap is fixed to a so-called guard value constituted by the threshold value $\epsilon$ (in the present embodiment, 0.95), the exhaust gas pressure $Pe(\theta_1)$ during the valve overlap is determined based on the threshold value $\epsilon$ (S18). In this way, when the load of the internal combustion engine 1 rises, the difference between the intake air pressure and the exhaust gas pressure is small and further the amount of residual gas itself becomes smaller, so even if the processing such as in S18 is executed, there is no effect due to changes in the exhaust gas pressure, the amount of air sucked into each combustion chamber 3 can be precisely calculated, and good, practical results can be obtained.

Further, in an internal combustion engine 1 provided with a plurality of combustion chambers 3 and a cylinder pressure sensor 15 provided for each combustion chamber 3, the amount of change $\Delta Pc$ of the cylinder pressure is calculated for each combustion chamber 3 and the amount of air sucked into each combustion chamber 3 is calculated based on the amount of change $\Delta Pc$ of the cylinder pressure in each combustion chamber 3 and the cylinder pressure $Pc(\theta_2)$ in each combustion chamber 3 detected by each cylinder pressure sensor 15. Due to this, it is possible to obtain a precise understanding of the variations in the amount of intake air between combustion chambers 3, so it is possible to improve the precision of control of the air-fuel ratio etc. in each combustion chamber 3.

On the other hand, when judging at S10 that the valve opening timing of the intake valve Vi is not advanced and no valve overlap between the intake valve Vi and the exhaust valve Ve is set, the ECU 20 sets the amount of change $\Delta Pc$ of the cylinder pressure used at S32 to zero (S34). Due to this, when no valve overlap is set, at S32, the amount of air $M_{air}$ sucked into each combustion chamber 3 is calculated based on only the cylinder pressure $Pc(\theta_2)$ obtained at S30. Here, the cylinder pressure during the compression stroke is a relative high value and can be precisely detected without regard to the detection precision of the cylinder pressure sensor 15 and the resolution of the cylinder pressure data, etc. Therefore, by using the cylinder pressure in the combustion chamber 3 at a predetermined timing during the compression stroke, it is possible to precisely find the amount of air sucked in the combustion chamber 3.

Note that in the above-mentioned internal combustion engine 1, when a negative judgment is made at S14, it is assumed that the ratio between the intake air pressure $Pm(\theta_1)$ and exhaust gas pressure $Pe(\theta_1)$ during valve overlap are fixed to the guard value constituted by the threshold value $\epsilon$, but the invention is not limited to this. That is, as shown in FIG. 4, the relationship between the ratio $Pm(\theta_1)/Pc(\theta_0)$ between the intake air pressure $Pm(\theta_1)$ and the cylinder pressure $Pc(\theta_0)$ and the ratio $Pm(\theta_1)/Pe(\theta_1)$ between the intake air pressure $Pm(\theta_1)$ and exhaust gas pressure $Pe(\theta_1)$ may be approximated using a plurality of functions.

Figure 4:
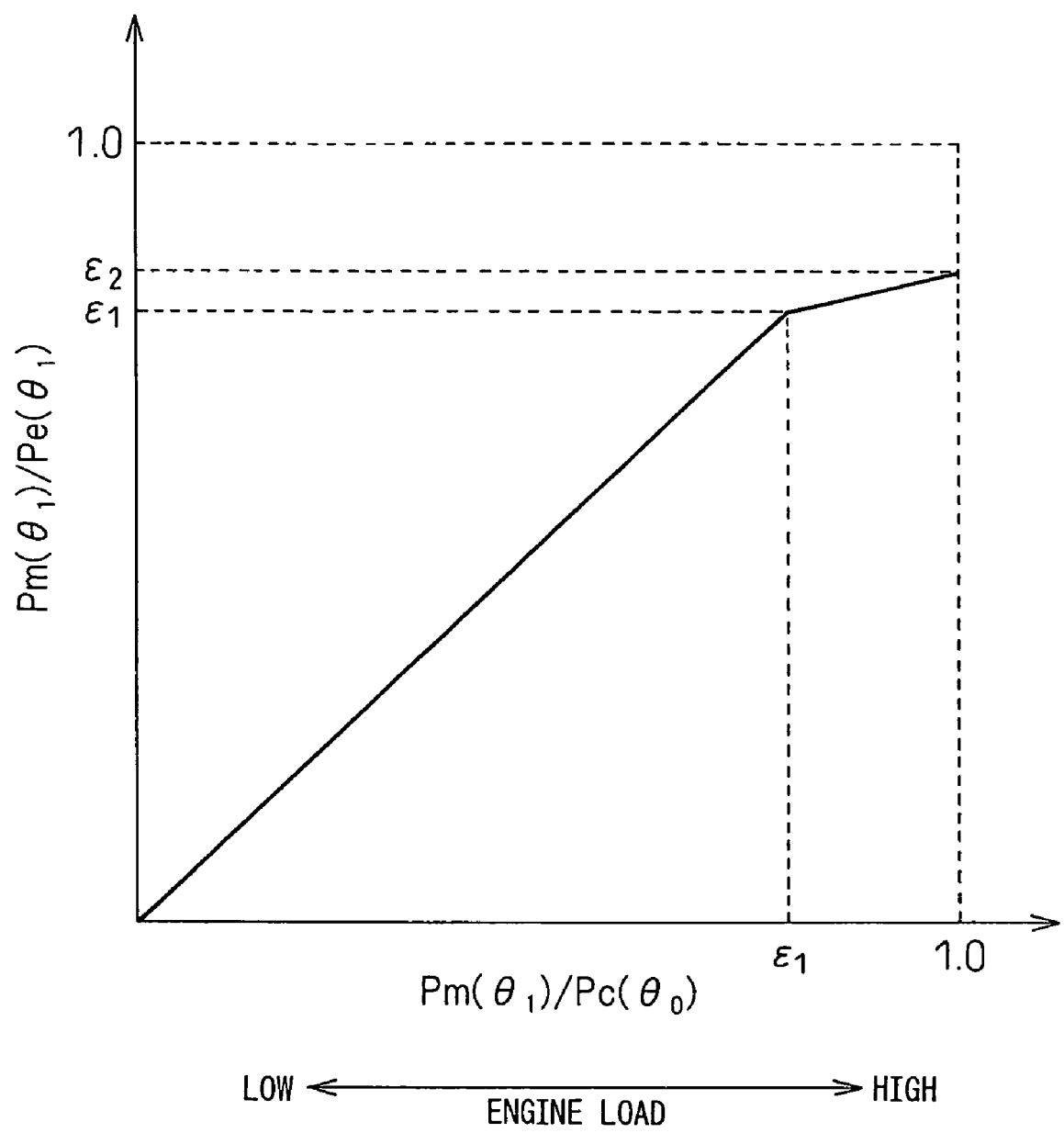
FIG. 4 is a graph illustrating the relationship between the ratio between the intake air pressure at a predetermined timing during valve overlap and the cylinder pressure at a predetermined timing immediately before or at the start of valve overlap and the ratio between an intake air pressure and exhaust gas pressure at a predetermined timing during valve overlap.

In the example of FIG. 4, the relationship between $Pm(\theta_1)/Pc(\theta_0)$ and $Pm(\theta_1)/Pe(\theta_1)$ is approximated using two lines. In the range where $0 \leq Pm(\theta_1)/Pc(\theta_0) \leq \epsilon_1$ (where, $\epsilon_1$ is a constant determined by experiments or experience), $Pm(\theta_1)/Pe(\theta_1)=Pm(\theta_1)/Pc(\theta_0)$, while in the range where $\epsilon_1 \leq Pm(\theta_1)/Pc(\theta_0) \leq 1.0$, $Pm(\theta_1)/Pe(\theta_1)$ is expressed by the following equation (8) (where, in equation (8), $\epsilon_2$ is a constant determined by experiments or experience, where $\epsilon_2 > \epsilon_1$). When this approximation technique is employed, when it is judged negatively at S14 of FIG. 2, at S18, the value of $Pe(\theta_1)$ is set in accordance with the following equation (9).

$$Pm(\theta_1)/Pe(\theta_1) = \frac{\varepsilon_2 - \varepsilon_1}{1 - \varepsilon_1} \cdot (Pm(\theta_1)/Pc(\theta_0) - \varepsilon_1) + \varepsilon_1 \quad (8)$$

$$Pe(\theta_1) = \frac{Pm(\theta_1)}{\left\{\varepsilon_1 + \frac{\varepsilon_2 - \varepsilon_1}{1 - \varepsilon_1} \cdot \left(\frac{Pm(\theta_1)}{Pc(\theta_0)} - \varepsilon_1\right)\right\}} \quad (9)$$

Further, in the present embodiment, the surge tank 8 is provided with an intake pressure sensor 16 for detecting the intake air pressure, but the intake pressure sensor 16 may also be omitted. The intake air pressure $Pm(\theta_1)$ at a predetermined timing during valve overlap (timing when crank angle becomes $\theta_1$) may also be estimated based on the cylinder pressure.

That is, the intake air pressure and the cylinder pressure become substantially equal at intake bottom dead center. Further, the timing when valve overlap is executed at a certain combustion chamber 3, in a four-cylinder engine, generally matches with the timing when intake bottom dead center arrives in another combustion chamber 3 where the intake stroke was executed ¼ cycle (180°) before the combustion chamber 3. Therefore, based on this, the intake air pressure during valve overlap in a certain combustion chamber 3 can be estimated based on the cylinder pressure at intake bottom dead center of the combustion chamber 3 where the intake stroke was executed ¼ cycle before the combustion chamber 3. Due to this, the intake pressure sensor 16 for detecting the intake air pressure becomes unnecessary and the cost required for calculating the amount of air sucked into each combustion chamber 3 can be reduced even more.

Figure 5:
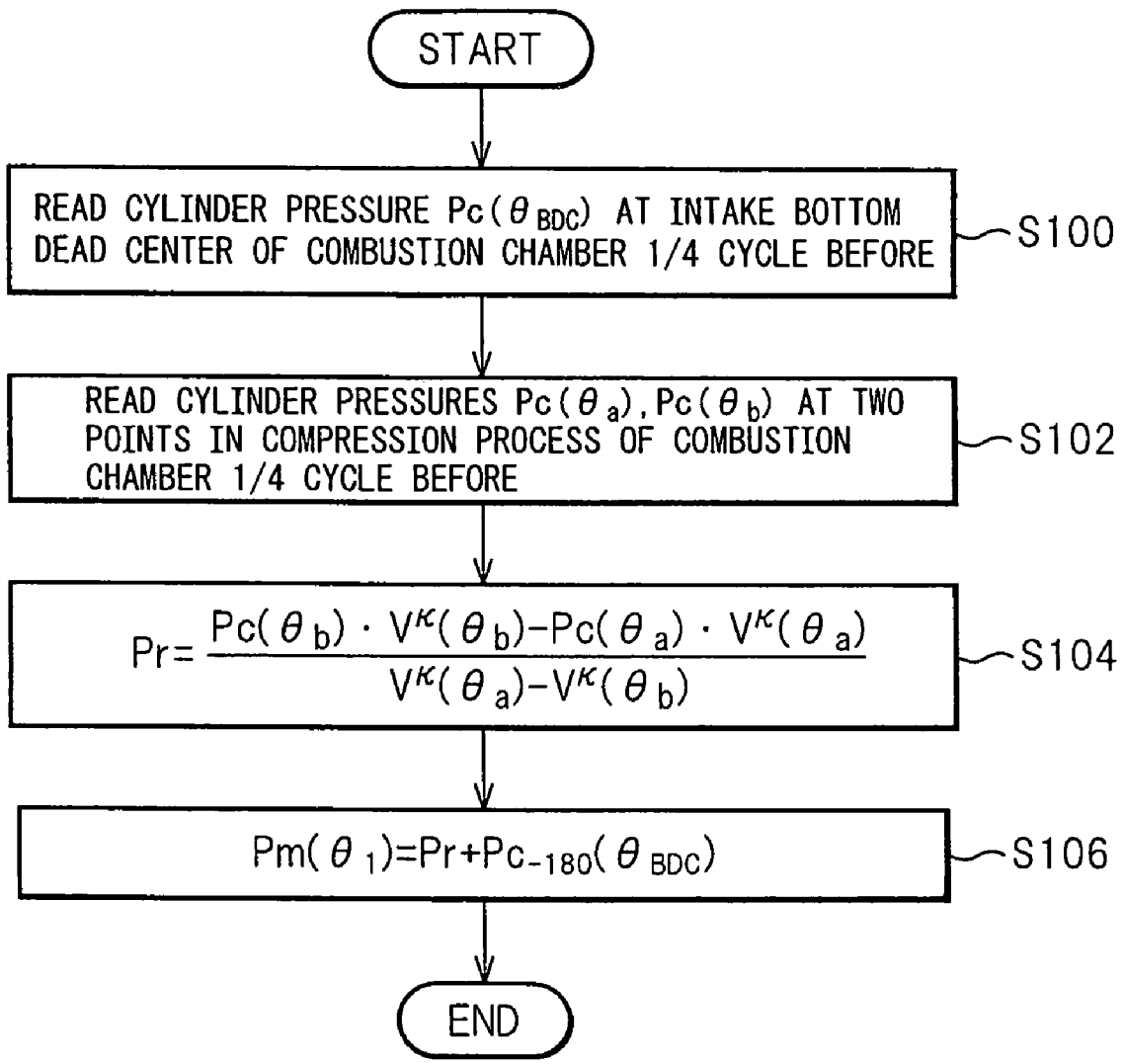
FIG. 5 is a flow chart for explaining the routine for estimating the intake air pressure at a predetermined timing during valve overlap based on the cylinder pressure.

FIG. 5 is a flow chart for explaining the routine for estimating the intake air pressure at a predetermined timing during valve overlap based on the cylinder pressure. The routine of FIG. 5 is executed by the ECU 20, for example, at a predetermined timing before S14 of FIG. 2. In this case, the ECU 20 reads from the predetermined storage region the detection value $Pc(\theta_{BDC})$ of the cylinder pressure sensor 15 at the nearest intake bottom dead center in the combustion chamber 3 (prior combustion chamber) where the intake stroke was executed ¼ cycle before the combustion chamber 3 concerned (S100). Further, the ECU 20 reads from a predetermined storage region the detection values $Pc(\theta_a)$ and $Pc(\theta_b)$ of the cylinder pressure sensor 15 at a predetermined two points in the compression stroke after intake bottom dead center of the combustion chamber 3 where the intake stroke was executed ¼ cycle before the combustion chamber 3 concerned (S102). Note that so long as the crank angles $\theta_a$ and $\theta_b$ are selected so as to be included in the compression stroke, they may be any values.

Here, if the intake pressure sensor is omitted, the output of the cylinder pressure sensor 15 (relative pressure) cannot be corrected in absolute pressure based on the detection value of the intake pressure sensor 16, so the detection values $Pc(\theta_a)$ and $Pc(\theta_b)$ of the cylinder pressure sensor 15 are stored in the storage region as they are without being corrected in absolute pressure (in the state showing the relative pressure). Here, when the cylinder pressure (true value) after correction of the absolute pressure when the crank angle becomes $\theta_a$ is Pa, the cylinder pressure (true value) after correction of the absolute pressure when the crank angle becomes $\theta_b$ is Pb, and the absolute pressure corrected value of the cylinder pressure sensor 15 is Pr, $Pa = Pc(\theta_a) + Pr$ $Pb = Pc(\theta_b) + Pr$ Further, when the compression stroke of the internal combustion engine is deemed to be an adiabatic process and the specific heat ratio is made $\kappa$, the relationship $Pa \cdot V^\kappa(\theta_a) = Pb \cdot V^\kappa(\theta_b)$ holds. This relationship can be expressed by the following equation (10). Further, by solving equation (10) for the absolute pressure corrected value Pr, the absolute pressure corrected value Pr is expressed as in the following equation (11).

$$(Pc(\theta_a) + Pr) \cdot V^\kappa(\theta_a) = (Pc(\theta_b) + Pr) \cdot V^\kappa(\theta_b) \qquad (10)$$

$$Pr = \frac{Pc(\theta_b) \cdot V^\kappa(\theta_b) - Pc(\theta_a) \cdot V^\kappa(\theta_a)}{V^\kappa(\theta_a) - V^\kappa(\theta_b)} \qquad (11)$$

For this reason, the ECU 20, after the processing of S102, uses the detection values $Pc(\theta_a)$ and $Pc(\theta_b)$ of the cylinder pressure sensor 15 at a two predetermined points in the compression stroke of the prior combustion chamber 3 and the cylinder volumes $V(\theta_a)$ and $V(\theta_b)$ of the two predetermined points to calculate, by the equation (11), the absolute pressure corrected value Pr of the cylinder pressure sensor 15 provided at the prior combustion chamber 3 (S104). Note that the values of the cylinder volumes $V(\theta_a)$ and $V(\theta_b)$ used at S104 are calculated in advance and stored in the storage device. The ECU 20 reads the values of the cylinder volumes $V(\theta_a)$ and $V(\theta_b)$ from the storage device and uses them for the processing of S20.

If finding the absolute pressure corrected value Pr at S104, the ECU 20 uses the detection value $Pc(\theta_{BDC})$ Of the cylinder pressure sensor 15 at intake bottom dead center obtained at S100 and the absolute pressure corrected value Pr found at S104 to calculate the intake air pressure $Pm(\theta_1)$ during valve overlap in the combustion chamber 3 concerned (S106). That is, the intake air pressure $Pm(\theta_1)$ during valve overlap at the particular combustion chamber 3 can be calculated as $Pm(\theta_1) = Pr + Pc_{-180}(\theta_{BDC})$ when the cylinder pressure at intake bottom dead center of the combustion chamber 3 where the intake stroke was executed ¼ cycle (in an N-cylinder engine, 1/N cycle) before the particular combustion chamber 3 is $Pc_{-180}(\theta_{BDC})$. In this way, by the routine of FIG. 5 being executed, without using an intake pressure sensor for detecting the intake air pressure, it is possible to precisely calculate the amount of air sucked into each combustion chamber 3 based on the cylinder pressure $P(\theta)$ and the cylinder volume $V(\theta)$ (based on the product $P(\theta) \cdot V^\kappa(\theta)$ between the cylinder pressure $P(\theta)$ and the value $V^\kappa(\theta)$ of the cylinder volume $V(\theta)$ to the power of a specific heat ratio (predetermined exponent) $\kappa$).

However, in the technique for calculating the amount of air $M_{air}$ sucked into a combustion chamber 3 explained above, finally the equation (7) is used to calculate the amount of intake air $M_{air}$, so the cylinder pressure Pc ($\theta_2$) is required. Here, the cylinder pressure $Pc(\theta_2)$, as explained above, is found based on a value detected at a predetermined timing during the compression stroke (timing after intake valve closes and before start of combustion (before spark ignition or before compression ignition)). Therefore, the technique for calculating the amount of intake air $M_{air}$ explained above can be used to calculate the amount of air $M_{air}$ only after the compression stroke has already been started at that cycle (that is, the current cycle).

Further, from this, usually, it is difficult to directly utilize the results of calculation obtained by the technique of calculating the amount of intake air $M_{air}$ explained above for control of the internal combustion engine in the current cycle. That is, taking as an example control of the air-fuel ratio, to make the air-fuel ratio the target air-fuel ratio, it is necessary to inject a suitable amount of fuel in accordance with the amount of intake air, so it is necessary to find the amount of intake air $M_{air}$ before fuel injection and determine the suitable amount of fuel injection in accordance with the same. However, in the technique for calculating the amount of intake air $M_{air}$ explained above, as explained above, the amount of intake air $M_{air}$ is found after the compression stroke has already started, so in the case of an intake pipe (intake port) injection type internal combustion engine, the amount of intake air $M_{air}$ is found after fuel injection. Even in the case of a direct injection type internal combustion engine such as the above-mentioned internal combustion engine 1, the amount of intake air $M_{air}$ ends up being found even at the earliest immediately before the fuel injection or so. For this reason, directly utilizing the results of calculation, that is, the amount of intake air $M_{air}$, for control of the air-fuel ratio of the internal combustion engine in the current cycle usually becomes difficult.

Based on the above, in another embodiment of the present invention, as explained below, the results of calculation obtained by the above-mentioned technique for calculating the amount of intake air $M_{air}$ are utilized for control of the internal combustion engine. That is, in this embodiment, a technique different from the above-mentioned technique for calculating the amount of air sucked into the combustion chamber 3 based on the cylinder pressure and the amount of change of the cylinder pressure (below, referred to as the "first intake air calculating technique"), that is, a second intake air calculating technique, may also be used to find the amount of air sucked into a combustion chamber 3. Here, this second intake air calculating technique can find the amount of air sucked into a combustion chamber 3 before the start of the compression stroke of the current cycle. Further, it can find the amount of air sucked into the combustion chamber 3 sufficiently before the fuel injection of the current cycle, more specifically estimates the amount of intake air in advance.

Further, in the present embodiment, the difference between the amount of intake air $M_{air}$ calculated by the first intake air calculating technique (below, referred to as the "first amount of intake air") for the prior cycle and the amount of intake air calculated by the second intake air calculating technique (below, referred to as the "second amount of intake air") for the prior cycle is found and that difference is used to correct the amount of intake air calculated by the second intake air calculating technique for the current cycle, that is, the value of the second amount of intake air for the current cycle. Further, the internal combustion engine is controlled based on this corrected second amount of intake air.

That is, as explained above, according to the second intake air calculating technique, it is possible to find the amount of air sucked into a combustion chamber 3 sufficiently before fuel injection of the current cycle. Further, the value used for the correction is the difference between the first amount of intake air $M_{air}$ and the second amount of intake air for the prior cycle, so can be found before the start of the current cycle. For this reason, the corrected second amount of intake air can be found sufficiently before fuel injection of the current cycle. Therefore, it becomes possible to use the corrected second amount of intake air for control of the internal combustion engine in the current cycle. That is, for example, based on the corrected second amount of intake air, it is possible to determine the amount of fuel injection in the current cycle to control the air-fuel ratio. Further, when there are a plurality of combustion chambers, it is possible to estimate the variation of the generated torque between cylinders based on the variation between cylinders of the amount of fuel injection determined based on this corrected second amount of intake air, set the amount of delay of the ignition timing for each cylinder in accordance with this, and control the ignition timing for delay and to thereby suppress variation between cylinders of the generated torque.

However, as the second intake air calculating technique, the technique of finding the amount of intake air based on the detection value of the air flow meter or the detection value of the intake pressure sensor or various other techniques may be envisioned, but in the present embodiment, as the second intake air calculating technique, the technique of using a physical model of the intake system is used. Therefore, next, the technique of using a physical model of the intake system used as the second intake air calculating technique for calculating the amount of intake air in the present embodiment will be explained.

This technique creates a model of the intake system of an internal combustion engine and applies to this model the Law of Conservation of Energy, the Law of Conservation of Mass, state equations, etc. to calculate the amount of intake air of the engine (the amount of air sucked into a combustion chamber 3). In this technique, for example, for the intake system of the internal combustion engine, a throttle model, intake pipe model, intake valve model, etc. are constructed. By using these models, the amount of intake air is found from the throttle valve opening degree, atmospheric pressure, atmospheric temperature, etc. Note that in the present embodiment, since this technique is used to find the amount of intake air, the configuration shown in FIG. 1 is further provided with a throttle opening degree sensor, atmospheric pressure sensor, and atmospheric temperature sensor. Further, the processing relating to this technique is performed in the ECU 20.

Figure 6:
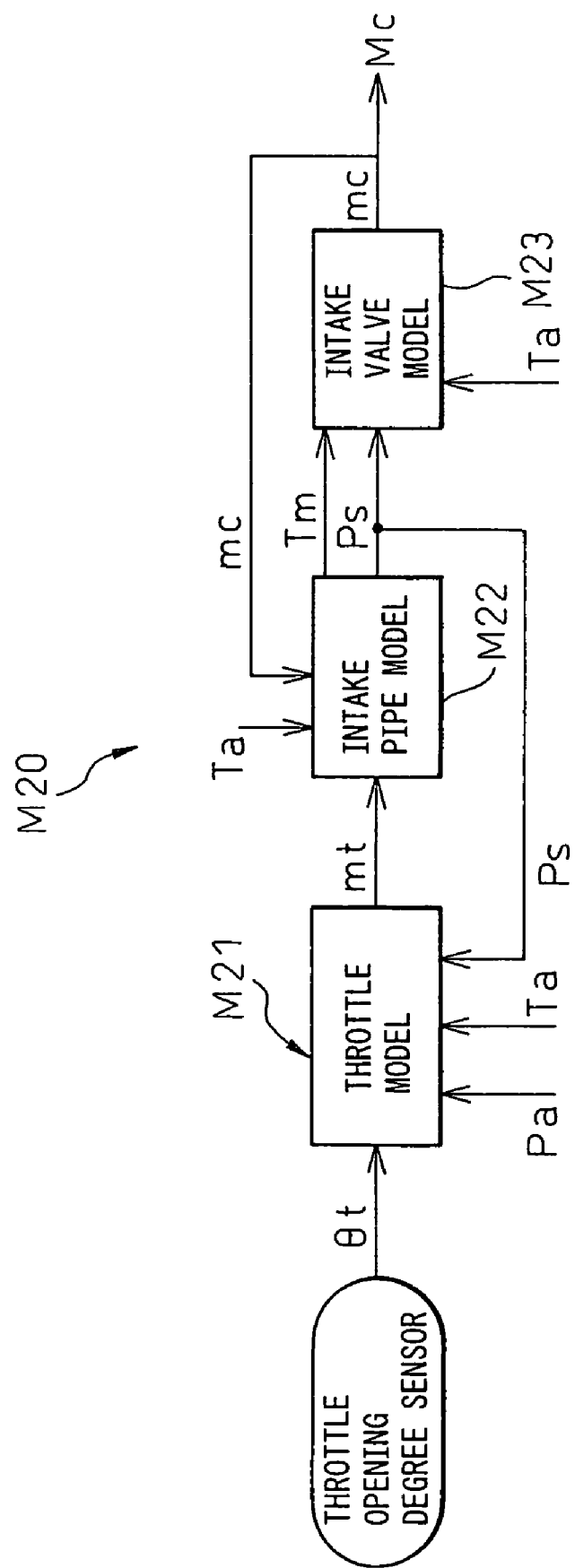
FIG. 6 is a view of an intake air model.

FIG. 6 is a view of the intake air model M20 which is a model of an intake system of an internal combustion engine for this technique. The intake air model M20, as shown in FIG. 6, is provided with a throttle model M21, intake pipe model M22, and intake valve model M23. The throttle model M21 receives as input the opening degree θt of the throttle valve detected by the throttle opening degree sensor (throttle valve opening degree), the atmospheric pressure Pa around the internal combustion engine detected by the atmospheric pressure sensor, the atmospheric temperature Ta around the internal combustion engine detected by the atmospheric temperature sensor, and the pressure Ps in the intake pipe from the throttle valve to the intake valve calculated in the later explained intake pipe model M22 (intake pipe pressure). By entering the values of these input parameters into the later explained model equations of the throttle model M21, the flow rate mt of the air passing through the throttle valve per unit time (throttle valve passage air flow rate) is calculated. The throttle valve passage air flow rate mt calculated in the throttle model M21 is input to the intake pipe model M22.

The intake pipe model M22 receives as input the valve passage air flow rate mt calculated in the throttle model M21 and the flow rate of the air sucked into a combustion chamber per unit time explained in detail later (below, referred to as the "combustion chamber intake air flow rate mc". Note that the definition of the combustion chamber intake air flow rate mc will be explained in detail in the explanation of the intake valve model M23). By entering the values of these input parameters into the later explained model equations of the intake pipe model M22, the intake pipe pressure Ps and the temperature Tm in the intake pipe from the throttle valve to the intake valve (intake pipe temperature) are calculated. The intake pipe pressure Ps and the intake pipe temperature Tm calculated at the intake pipe model M22 are both input to the intake valve model M23, while the intake pipe pressure Ps is also input to the throttle model M21.

The intake valve model M23 receives as input the intake pipe pressure Ps and intake pipe temperature Tm calculated at the intake pipe model M22 and also the atmospheric temperature Ta. By entering these values into the later explained model equations of the intake valve model M23, the combustion chamber intake air flow rate mc is calculated. Further, based on this combustion chamber intake air flow rate mc, that is, by converting this combustion chamber intake air flow rate mc, the amount of intake air Mc (the amount of air sucked into a combustion chamber 3) is calculated. Further, the combustion chamber intake air flow rate mc calculated at the intake valve model M23 is input to the intake pipe model M22.

As will be understood from FIG. 6, in the intake air model M20, the values of the parameters calculated in one model are utilized as input values for another model. For this reason, when using the intake air model M20, the amount of intake air Mc can be calculated from the atmospheric pressure Pa, atmospheric temperature Ta, throttle valve opening degree θt, and engine speed.

Next, the models M21 to M23 of the intake air model M20 will be explained.

Figure 7:
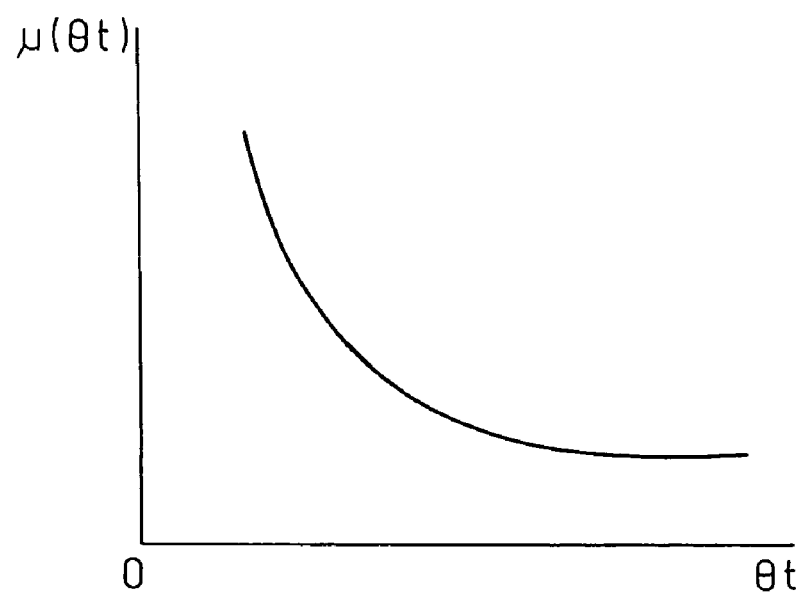
FIG. 7 is a view of the relationship between the throttle valve opening degree and the flow rate coefficient.

In the throttle model M21, from the atmospheric pressure Pa (kPa), atmospheric temperature Ta (K), intake pipe pressure Ps (kPa), and throttle valve opening degree θt, the throttle valve passage air flow rate mt (g/s) is calculated based on the following equation (12). Here, the μ in equation (12) is the flow rate coefficient in the throttle valve, that is, a function of the throttle valve opening degree θt and is determined from the map shown in FIG. 7. Further, At($m^2$) shows the opening sectional area of the throttle valve (throttle opening area) and is a function of the throttle valve opening degree θt. Note that if making μ·At by combining these flow rate coefficient μ and throttle opening area At, the μ·At may be found from a single map from the throttle valve opening degree θt. Further, R is a gas constant.

$$mt = \mu \cdot At \cdot \frac{Pa}{\sqrt{R \cdot Ta}} \cdot \Phi\left(\frac{Ps}{Pa}\right) \qquad (12)$$

Figure 8:
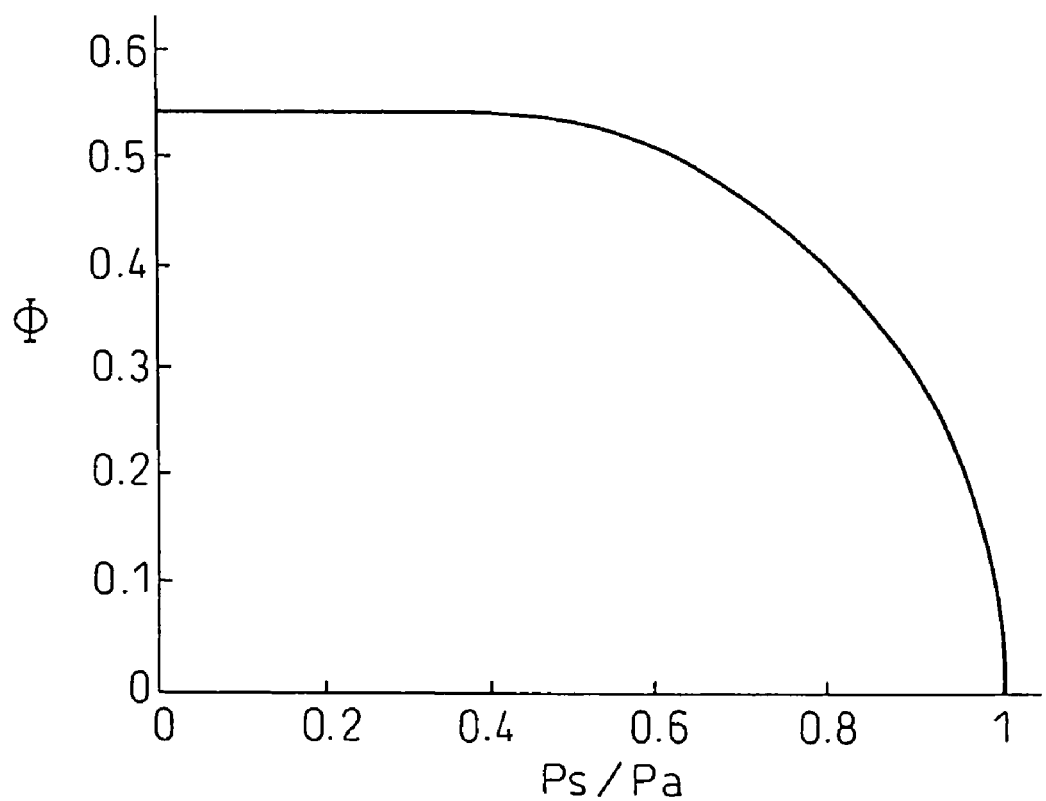
FIG. 8 is a view of the function $\Phi(Ps/Pa)$.

$\Phi(Ps/Pa)$ is a function shown by the following equation (13). The $\kappa$ in this equation (13) is the specific heat ratio ($\kappa$=Cp (constant pressure specific heat)/Cv (constant volume specific heat), a constant value). This function $\Phi(Ps/Pa)$ can be expressed in a graph as shown in FIG. 8, so it is also possible to store such a graph as a map in the ROM of the ECU and find the value of $\Phi(Ps/Pa)$ from the map without actually using the equation (13) for calculation.

$$\Phi\left(\frac{Ps}{Pa}\right) = \begin{cases} \sqrt{\frac{\kappa}{2(\kappa+1)}} & \cdots \frac{Ps}{Pa} \leq \frac{1}{\kappa+1} \\ \sqrt{\left\{\left(\frac{\kappa-1}{2\kappa}\right) \cdot \left(1 - \frac{Ps}{Pa}\right) + \frac{Ps}{Pa}\right\} \cdot \left(1 - \frac{Ps}{Pa}\right)} & \cdots \frac{Ps}{Pa} > \frac{1}{\kappa+1} \end{cases} \qquad (13)$$

Figure 9:
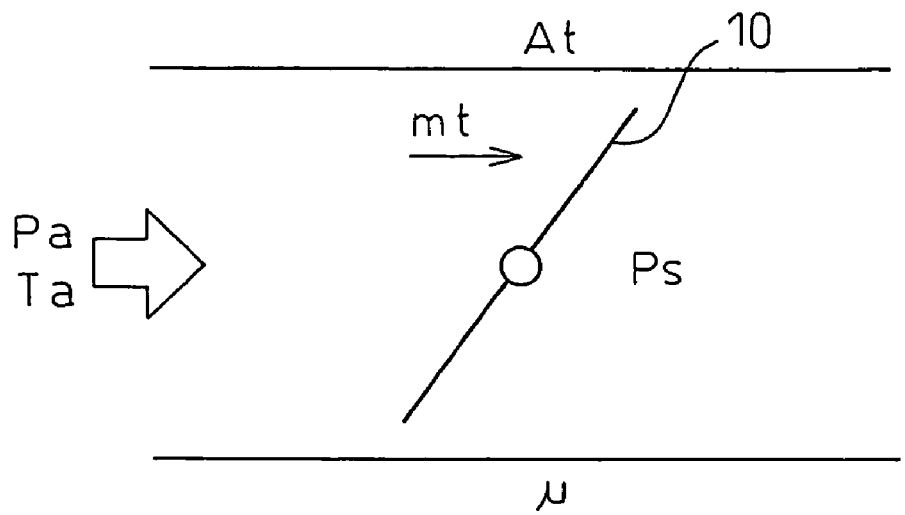
FIG. 9 is a view of the basic concept of a throttle model.

These equation (12) and equation (13) of the throttle model M21 are obtained by using the pressure of the gas upstream of the throttle valve 10 as the atmospheric pressure Pa, the temperature of the gas upstream of the throttle valve 10 as the atmospheric temperature Ta, and the pressure of the gas passing through the throttle valve 10 as the intake pipe pressure Ps, applying to the model of the throttle valve 10 shown in FIG. 9 the Law of the Conservation of Mass, the Law of the Conservation of Energy, and the Law of the Conservation of Motion, and further utilizing the state equation of gas, the definition of the specific heat ratio, and Mayer's formula.

In the intake pipe model M22, the intake pipe pressure Ps(kPa) and intake pipe temperature Tm(K) are calculated from the throttle valve passage air flow rate mt(g/s), combustion chamber intake air flow rate mc(g/s), and atmospheric temperature Ta(K) based on the following equation (14) and equation (15). Note that the Vm(m³) in equation (14) and equation (15) is a constant equal to the volume of the part of the intake pipe etc. from the throttle valve 10 to the intake valve Vi including the surge tank 8 (below, referred to as the "intake pipe part") 8'.

$$\frac{d}{dt}\left(\frac{Ps}{Tm}\right) = \frac{R}{Vm} \cdot (mt - mc) \qquad (14)$$

$$\frac{dPs}{dt} = \kappa \cdot \frac{R}{Vm} \cdot (mt \cdot Ta - mc \cdot Tm) \qquad (15)$$

Figure 10:
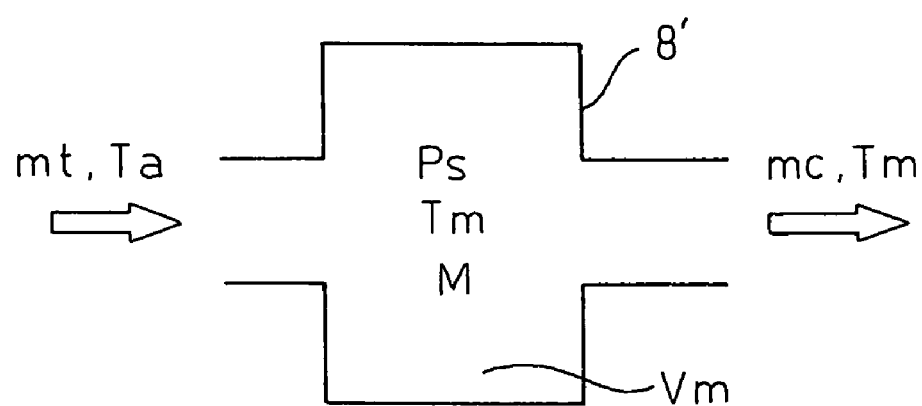
FIG. 10 is a view of the basic concept of an intake pipe model.

Here, the intake pipe model M22 will be explained with reference to FIG. 10. If making the total amount of gas of the intake pipe part 8' M, the change over time of the total amount of gas M is equal to the difference between the flow rate of the gas flowing into the intake pipe part 8', that is, the throttle valve passage air flow rate mt, and the flow rate of gas flowing out from the intake pipe part 8', that is, the combustion chamber intake air flow rate mc, so from the Law of Conservation of Mass, the following equation (16) is obtained, while from this equation (16) and the state equation of gas (Ps·Vm=M·R·Tm), equation (14) is obtained.

$$\frac{dM}{dt} = mt - mc \qquad (16)$$

Further, the amount of change over time of the energy M·Cv·Tm of the gas of the intake pipe part 8' is equal to the difference between the energy of the gas flowing into the intake pipe part 8' and the energy of the gas flowing out from the intake pipe part 8'. For this reason, if making the temperature of the gas flowing into the intake pipe part 8' the atmospheric temperature Ta and making the temperature of the gas flowing out from the intake pipe part 8' the intake pipe temperature Tm, from the Law of Conservation of Energy, the following equation (17) is obtained, while from this equation (17) and the state equation of gas, equation (15) is obtained.

$$\frac{d(M \cdot Cv \cdot Tm)}{dt} = Cp \cdot mt \cdot Ta - Cp \cdot mc \cdot Tm \qquad (17)$$

In the intake valve model M23, the combustion chamber intake air flow rate mc is calculated from the intake pipe pressure Ps, intake pipe temperature Tm, and atmospheric temperature Ta based on the following equation (18). a and b in equation (18) are compliance parameters determined based on at least the engine speed Ne. A map is prepared in advance and, in accordance with need, the map is searched through for finding them. Note that as shown by the configuration shown in FIG. 1, when the intake valves Vi are provided with a valve mechanism VM including a variable valve timing mechanism, the compliance parameters a and b are determined also based on the opening/closing timings of the intake valves Vi (that is, the amounts of advance or delay from the standard opening/closing timing) etc.

$$mc = \frac{Ta}{Tm}(a \cdot Ps - b) \qquad (18)$$

Figure 11:
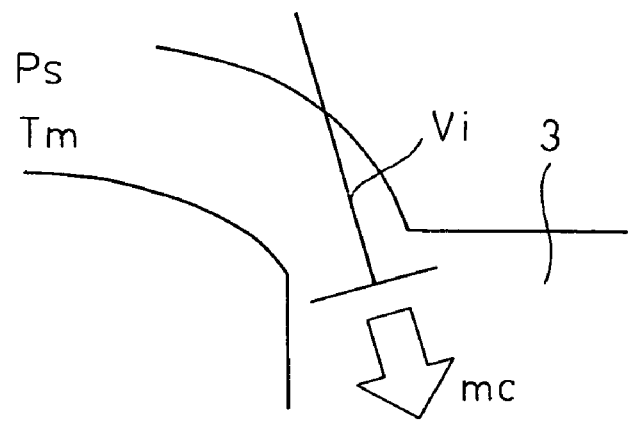
FIG. 11 is a view of the basic concept of an intake valve model.

The above-mentioned intake valve model M23 will be explained with reference to FIG. 11. In general, the amount of air filled into a combustion chamber 3 at the time an intake valve Vi is closed, that is, the amount of intake air Mc, is determined when the intake valve Vi closes (at the time of closing of the intake valve) and is proportional to the pressure in the combustion chamber 3 at the time of closing of the intake valve. Further, the pressure in the combustion chamber 3 at the time of closing of the intake valve can be deemed equal to the pressure of the gas upstream of the intake valve, that is, the intake pipe pressure Ps. Therefore, the amount of intake air Mc can be approximated as being proportional to the pressure Ps in the intake pipe at the time of closing of the intake valve.

Here, if making the average of the amount of air flowing out from the intake pipe part 8' per unit time or the average of the amount of air sucked in from the intake pipe part 8' to all of the combustion chambers 3 per unit time over the intake stroke of one cylinder the combustion chamber intake air flow rate mc (explained in detail below), as the amount of intake air Mc is proportional to the intake pipe pressure Ps, the combustion chamber intake air flow rate mc can also be considered to be proportional to the intake pipe pressure Ps. From this, the equation (18) is obtained based on theory and experience. Note that the compliance parameter a in equation (18) is a proportional coefficient, while the compliance parameter b is a value relating to the amount of burned gas remaining in a combustion chamber 3 at the time of closing of the exhaust valve. Further, in actual operation, since the intake pipe temperature Tm may change sharply in a transient operation, this is corrected by being multiplied with Ta/Tm derived based on theory and experience.

Figure 12:
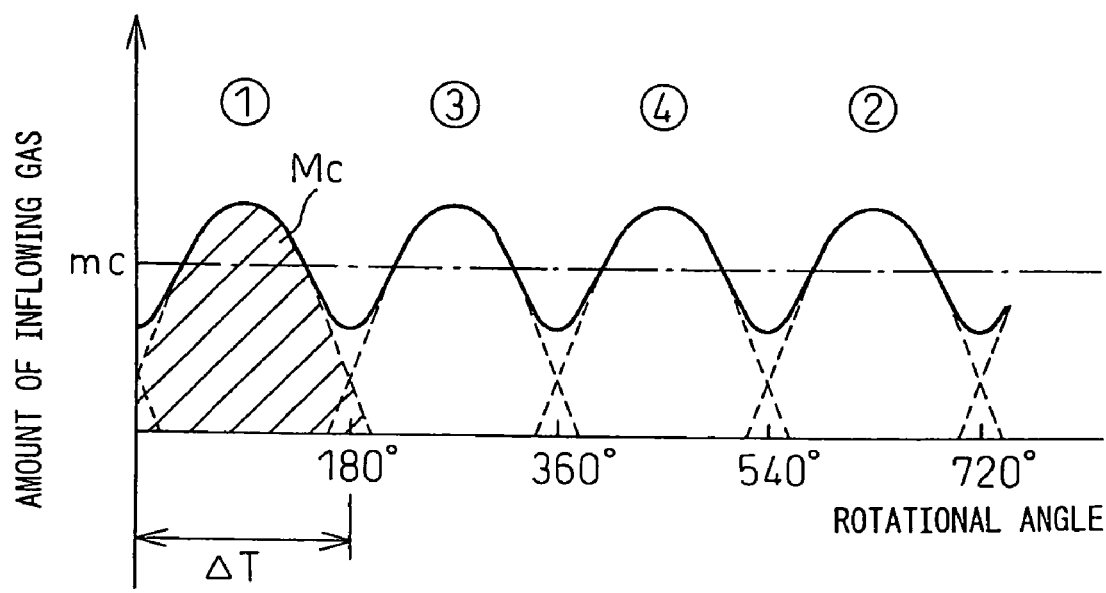
FIG. 12 is a view relating to the definitions of the amount of intake air Mc and combustion chamber intake air flow rate mc.

Here, the combustion chamber intake air flow rate mc will be explained with reference to FIG. 12 for the case where the internal combustion engine is a four-cylinder engine. Note that in FIG. 12, the abscissa indicates the rotational angle of the crankshaft and the ordinate indicates the amount of air actually flowing from the intake pipe part 8' to the combustion chamber 3 per unit time. As shown in FIG. 12, in a four-cylinder internal combustion engine, the intake valves Vi open in for example the order of the #1 cylinder, #3 cylinder, #4 cylinder, and the #2 cylinder and air flows from the intake pipe part 8' to the combustion chamber 3 of each cylinder in accordance with the amount of opening of the intake valve Vi corresponding to each cylinder. The change in the flow rate of the air flowing from the intake pipe part 8' to the combustion chamber 3 of each cylinder is as shown by the broken line in FIG. 12. The flow rate of air flowing from the intake pipe part 8' to the combustion chambers 3 of all of the cylinders is as shown by the solid line in FIG. 12. Further, for example, the amount of intake air Mc of the #1 cylinder corresponds to the part shown by the hatching in FIG. 12.

As opposed to this, the average of the amounts of air flowing from the intake pipe part 8' into the combustion chambers 3 of all of the cylinders shown by the solid line is the combustion chamber intake air flow rate mc and is shown by the one-dot chain line in the figure. Further, the combustion chamber intake air flow rate mc shown by the one-dot chain line multiplied with the time $\Delta T_{180°}$ (calculated from the engine speed) taken for the crankshaft to rotate by 180° in the case of four cylinders (that is, in a four-stroke type internal combustion engine, the angle 720° by which the crankshaft rotates during one cycle divided by the number of cylinders) becomes the amount of intake air Mc. Therefore, by multiplying the combustion chamber intake air flow rate mc calculated at the intake valve model M23 with $\Delta T_{180°}$, it is possible to calculate the amount of intake air Mc (Mc=mc·$\Delta T_{180°}$).

Next, the case of using the intake air model M20 to actually calculate the amount of intake air Mc will be explained. The amount of intake air Mc is found by using the intake air model M20 to solve the equation (12), equation (14), equation (15), and equation (18). In this case, for the processing at the ECU 20, these equations must be made discrete. If using the timing t and calculation interval (discrete time) $\Delta t$ to make the equation (12), equation (14), equation (15), and equation (18) discrete, the following equation (19), equation (20), equation (21), and equation (22) are obtained. Note that the intake pipe temperature Tm(t+$\Delta t$) is calculated by equation (23) from the Ps/Tm(t+$\Delta t$) and Ps(t+$\Delta t$) calculated by equation (20) and equation (21).

$$mt(t) = \mu \cdot At(\theta t(t)) \cdot \frac{Pa}{\sqrt{R \cdot Ta}} \Phi\left(\frac{Ps(t)}{Pa}\right) \quad (19)$$

$$\frac{Ps}{Tm}(t + \Delta t) = \frac{Ps}{Tm}(t) + \Delta t \cdot \frac{R}{Vm} \cdot (mt(t) - mc(t)) \quad (20)$$

$$Ps(t + \Delta t) = Ps(t) + \Delta t \cdot \kappa \cdot \frac{R}{Vm} \cdot (mt(t) \cdot Ta - mc(t) \cdot Tm(t)) \quad (21)$$

$$mc(t) = \frac{Ta}{Tm(t)} \cdot (a \cdot Ps(t) - b) \quad (22)$$

$$Tm(t + \Delta t) = \frac{Ps(t + \Delta t)}{Ps/Tm(t + \Delta t)} \quad (23)$$

In this implemented intake air model M20, the throttle valve passage air flow rate mt(t) at the timing t calculated by equation (19) of the throttle model M21 and the intake air flow rate mc(t) in the combustion chamber at the timing t calculated by equation (22) of the intake valve model M23 are entered into equation (20) and equation (21) of the intake pipe model M22. From this, the intake pipe pressure Ps(t+$\Delta t$) and intake pipe temperature Tm(t+$\Delta t$) at the timing t+$\Delta t$ are calculated. Next, the calculated Ps(t+$\Delta t$) and Tm(t+$\Delta t$) are entered into equation (19) and equation (22) of the throttle model M21 and intake valve model M23, whereby the throttle valve passage air flow rate mt(t+$\Delta t$) and combustion chamber intake air flow rate mc(t+$\Delta t$) at the timing t+$\Delta t$ are calculated. Further, by repeating this calculation, the combustion chamber intake air flow rate mc at any timing t is calculated from the throttle valve opening degree $\theta t$, the atmospheric pressure Pa and atmospheric temperature Ta. By multiplying the calculated combustion chamber intake air flow rate mc with the time $\Delta T_{180°}$, the amount of intake air Mc at any timing t is calculated. Further, as is clear from the above explanation, according to this technique, it is possible to estimate the amount of air going to be sucked into a combustion chamber 3.

Note that at the startup of the internal combustion engine, that is, at the timing t=0, the intake pipe pressure Ps is made equal to the atmospheric pressure (Ps(0)=Pa), the intake pipe temperature Tm is made equal to the atmospheric temperature (Tm(0)=Ta), and the calculations at the models M21 to M23 are started.

Further, in the intake air model M20, it is assumed that the atmospheric temperature Ta and atmospheric pressure Pa are constant, but they may also be values changing according to the timing. For example, the value detected at the timing t by an atmospheric temperature sensor for detecting the atmospheric temperature may be used as the atmospheric temperature Ta(t) and the value detected at the timing t by an atmospheric pressure sensor for detecting the atmospheric pressure may be used as the atmospheric pressure Pa(t) and these values may be entered into the equation (19), equation (22), and equation (23).

Next, based on the above explanation, while referring to FIG. 13, the routine for calculating the amount of air sucked into each combustion chamber 3 in the present embodiment will be explained. In the present embodiment, when the internal combustion engine 1 is started, the ECU 20 repeatedly executes the intake air calculation routine shown in FIG. 13 for each combustion chamber. Note that, at the time of startup of the internal combustion engine 1, the value of the parameter n showing the number of cycles used in this control is designed to be made "1" (n=1).

When this control routine is started, first, at S101, it is judged if the value of the parameter n is "1". As explained above, this parameter n is designed to be made "1" at the time of startup of the internal combustion engine 1, so this judgment can be said to be judgment as to if the internal combustion engine 1 has just been started. When it is judged at S101 that the parameter n is "1", that is, the internal combustion engine 1 has just been started, the routine proceeds to S103. On the other hand, when it is judged at S101 that the parameter n is not "1", that is, the internal combustion engine 1 has not just been started, the routine proceeds to S107.

When proceeding to S103, the amount of intake air of the n-th cycle, that is, the amount of air Mc(n) sucked into the combustion chamber 3 at the current cycle, is calculated by the above-mentioned second intake air calculating technique. Further, at the next S105, the amount of intake air of the n-th cycle, that is, the amount of intake air Ms(n) used for control as the amount of air sucked into the combustion chamber 3 at the current cycle, is determined. That is, based on the amount of intake air Ms(n) determined here, for example, the amount of fuel injection in the current cycle is determined and the air-fuel ratio is controlled.

Further, when proceeding to S105, this amount of intake air Ms(n) is made the amount of intake air Mc(n) calculated at S103 by the second intake air calculating technique. When the amount of intake air Ms(n) is determined at S105, the routine proceeds to S115. At S115, by the first intake air calculating technique, the amount of intake air of the n-th cycle, that is, the amount of air $M_{air}(n)$ sucked into the combustion chamber 3 at the current cycle is calculated.

When the amount of intake air $M_{air}(n)$ is calculated at S115, the routine proceeds to S117, where the value of the parameter n showing the number of cycles is incremented by 1. Further, after this, the control routine is immediately re-executed from the start (that is, from S101).

On the other hand, when it is judged at S101 that the parameter n is not "1", that is, the internal combustion engine 1 has not just been started, as explained above, the routine proceeds to S107, but in this case as well, in the same way as when the routine proceeds to S103, the amount of intake air of the n-th cycle, that is, the amount of air Mc(n) sucked into the combustion chamber 3 at the current cycle is calculated by the above-mentioned second intake air calculating technique.

When the amount of intake air Mc(n) is calculated at S107, the routine proceeds to S109. At S109, the correction amount Dm(n) used for finding the amount of intake air of the n−1-th cycle, that is, the amount of intake air Ms(n) used for control as the amount of air sucked into the combustion chamber 3 at the current cycle, is calculated. Here, this correction amount Dm(n) is calculated as the difference between the amount of intake air of the n−1-th cycle calculated by the first intake air calculating technique, that is, the amount of air $M_{air}(n-1)$ sucked into the combustion chamber 3 at the prior cycle and the amount of intake air of the n−1-th cycle calculated by the second intake air calculating technique, that is, the amount of air Mc(n−1) sucked into the combustion chamber 3 at the prior cycle (Dm(n)= $M_{air}(n-1)-Mc(n-1)$).

When the correction amount Dm(n) is calculated at S109, the routine proceeds to S111. At S111, it is judged if the correction amount Dm(n) calculated at S109 is less than the predetermined value Dc. Further, when it is judged at S111 that the correction amount Dm(n) is less than the predetermined value Dc, the routine proceeds to S113.

At S113, as in the above-mentioned S105, the amount of intake air of the n-th cycle, that is, the amount of intake air Ms(n) used for control as the amount of air sucked into the combustion chamber 3 at the current cycle, is determined. That is, as explained above, based on the thus determined amount of intake air Ms(n), for example, the amount of fuel injection in the current cycle is determined and the air-fuel ratio is controlled.

However, when proceeding to S113, unlike when proceeding to S105, this amount of intake air Ms(n) is made the value of the amount of intake air Mc(n) calculated at S107 by the second intake air calculating technique plus the correction amount Dm(n). If the amount of intake air Ms(n) is determined at S113, the routine proceeds to S115, from where the control explained above is performed.

On the other hand, at S111, when it is judged that the correction amount Dm(n) is a predetermined value Dc or more, the routine proceeds to the S105. Further, in this case, the amount of intake air Ms(n) is made the amount of intake air Mc(n) calculated at S107 by the second intake air calculating technique. Further, after this, the routine proceeds to S115, from where the control explained above is performed.

Note that, as will be understood from the above explanation, the judgment at the S111 is judgment for determining whether to perform the correction based on the correction amount Dm(n) when finding the amount of intake air Ms(n). That is, in the present embodiment, when the correction amount Dm(n) is the predetermined value Dc or more in the judgment at the S111, the correction is not performed.

This is because, when the correction amount Dm(n) calculated at S109 is considerably large, there is a high possibility that the precision of the correction amount itself is not sufficient so, in such a case, it is believed to be preferable not to perform the correction. In particular, in the first intake air calculating technique, the detection value of the cylinder pressure sensor 15 is used to calculate the amount of intake air $M_{air}$, so when the sensor output includes noise etc., the precision of the calculated amount of intake air $M_{air}$ is liable to sharply drop. For this reason, in the present embodiment, when the correction amount Dm(n) is large, that is, when it is the predetermined value Dc or more, the correction is not performed and the amount of intake air Ms used for the control is made the amount of intake air Mc calculated by the second intake air calculating technique (S105). Note that the value Dc used for the judgment of the S111 is suitably set in advance considering the above point and the technical features of the first and second intake air calculating techniques.

Figure 13:
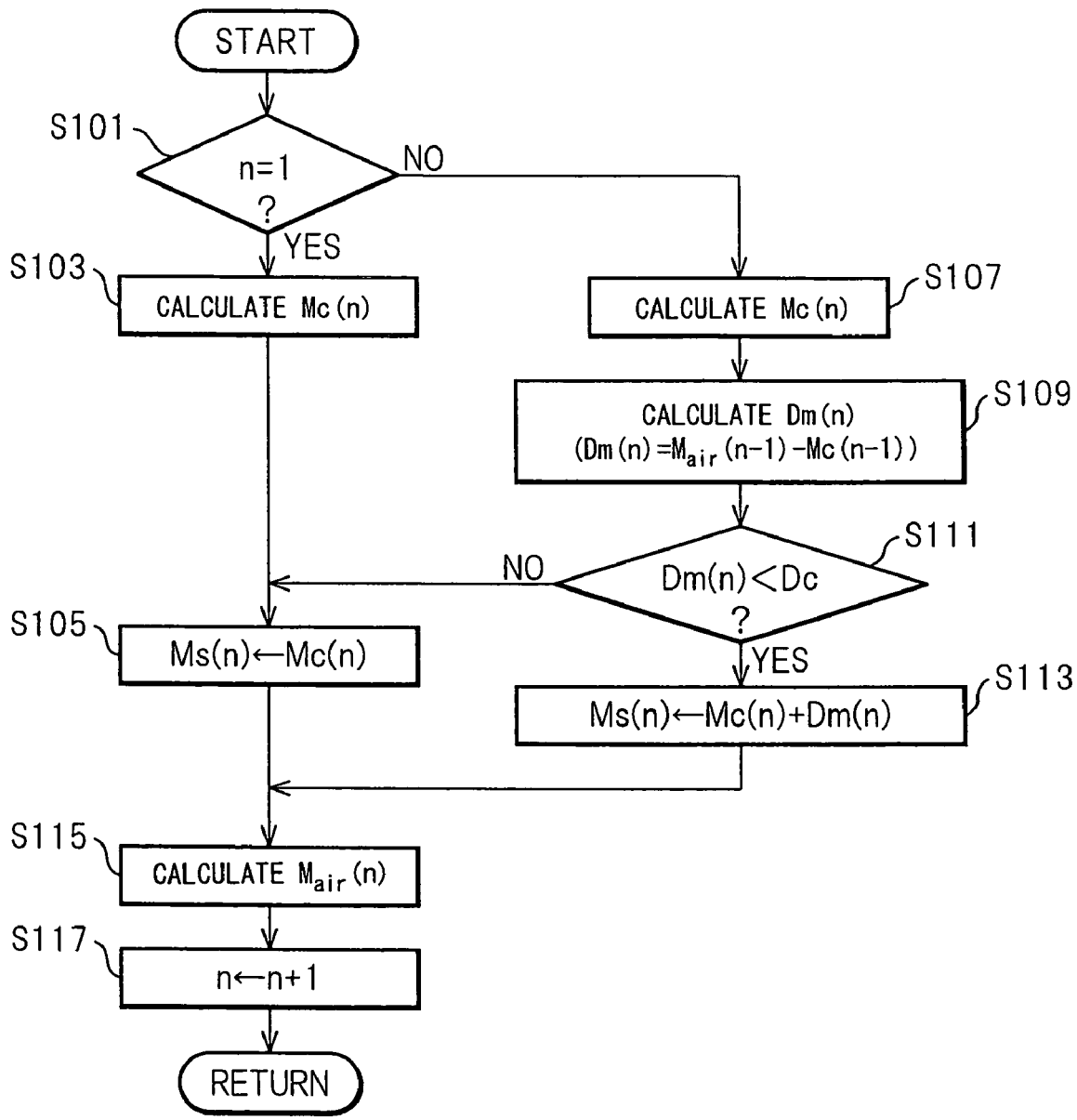
FIG. 13 is a flow chart for explaining an intake air amount calculation routine in another embodiment of the present invention.

Further, as is clear from the above explanation, when the intake air calculation routine shown in FIG. 13 is executed, the amount of air Ms sucked into the combustion chamber 3 used for the control of the internal combustion engine can be said to be calculated based on the amount of air $M_{air}$ sucked into the combustion chamber 3 calculated by the first intake air calculating technique and the amount of air Mc sucked into the combustion chamber 3 calculated by the second intake air calculating technique.

In more detail, in this case, by having the amount of air Mc(n) sucked into the combustion chamber 3 in the current cycle calculated by the second intake air calculating technique corrected based on the amount of air $M_{air}(n-1)$ sucked into the combustion chamber 3 in the prior cycle calculated by the first intake air calculating technique, more specifically, by having it corrected based on the difference Dm(n) between the amount of air $M_{air}(n-1)$ sucked into the combustion chamber 3 in the prior cycle calculated by the first intake air calculating technique and the amount of air Mc(n−1) sucked into the combustion chamber 3 in the prior cycle calculated by the second intake air calculating technique, the amount of air Ms(n) sucked into the combustion chamber 3 in the current cycle used for control of the internal combustion engine is calculated.

Further, according to this, it is possible to effectively utilize the results of calculation of the first intake air calculating technique, that is, the amount of intake air $M_{air}$, to find the amount of intake air Ms used for control of the internal combustion engine with a better precision.

Further, as explained above, when the intake air calculation routine shown in FIG. 13 is executed, when the difference Dm(n) between the amount of air $M_{air}$(n−1) sucked into the combustion chamber 3 at the prior cycle calculated by the first intake air calculating technique and the amount of air Mc(n−1) sucked into the combustion chamber 3 at the prior cycle calculated by the second intake air calculating technique is a predetermined value Dc or more, correcting the amount of air Mc(n) sucked into the combustion chamber 3 at the current cycle calculated by the second intake air calculating technique based on the difference Dm(n), so as to calculate the amount of air Ms(n) sucked into the combustion chamber 3 in the current cycle, is prohibited.

As explained above, when the difference Dm(n) is considerably large, there is a high possibility that the precision of the value of that Dm(n) itself will not be sufficient, so in such a case, it is believed to be preferable not to make a correction. Therefore, by suitably setting the predetermined value Dc, when the difference Dm(n) is the value Dc or more as explained above, it is possible, by prohibiting correcting the amount of intake air Mc(n) based on the difference Dm(n) to calculate the amount of intake air Ms(n), to prevent unsuitable correction and a drop in the calculation precision of the amount of intake air Ms(n) due to the correction.

Note that the present invention is explained in detail based on specific embodiments, but a person skilled in the art can make various modifications, corrections, etc. without departing from the claims and the idea of the present invention.

The invention claimed is:

1. A control system of an internal combustion engine having a valve mechanism able to change a valve opening characteristic of at least one of an intake valve and exhaust valve and burning an air-fuel mixture comprised of fuel and air inside a combustion chamber to generate power, characterized by being provided with
a cylinder pressure detecting means for detecting a cylinder pressure at said combustion chamber and
an intake air calculating means for calculating an amount of air sucked into said combustion chamber based on an intake air pressure during valve overlap between said intake valve and said exhaust valve, an exhaust gas pressure during valve overlap, a cylinder pressure during the compression stroke detected by said cylinder pressure detecting means, and a gas passage effective area during said valve overlap.

2. A control system of an internal combustion engine as set forth in claim 1, wherein the exhaust gas pressure during valve overlap is estimated based on the cylinder pressure detected by the cylinder pressure detecting means before or at the start of valve overlap.

3. A control system of an internal combustion engine as set forth in claim 2, wherein the exhaust gas pressure during valve overlap is also estimated based on a load of the internal combustion engine.

4. A control system of an internal combustion engine as set forth in claim 3, wherein when the load of said internal combustion engine is higher than a predetermined load, the exhaust gas pressure during valve overlap is estimated higher than the cylinder pressure detected by the cylinder pressure detecting means before or at the start of valve overlap.

5. A control system of an internal combustion engine as set forth in claim 1, wherein said internal combustion engine has a plurality of said combustion chambers and is provided with said cylinder pressure detecting means for each combustion chamber and the intake air pressure during the valve overlap in any combustion chamber is estimated based on the cylinder pressure at intake bottom dead center of another combustion chamber where the intake stroke was executed before that combustion chamber.

6. A control system of an internal combustion engine as set forth in claim 1, wherein the system is further provided with a second intake air calculating means for calculating the amount of air sucked into said combustion chamber by a different technique from said intake air calculating means forming the first intake air calculating means and calculates the amount of air sucked into said combustion chamber used for control of said internal combustion engine based on the amount of air sucked into said combustion chamber calculated by said first intake air calculating means and the amount of air sucked into said combustion chamber calculated by said second intake air calculating means.

7. A control system of an internal combustion engine as set forth in claim 6, wherein the amount of air sucked into said combustion chamber in the current cycle calculated by said second intake air calculating means is corrected based on the amount of air sucked into said combustion chamber in the previous cycle calculated by said first intake air calculating means so as to calculate the amount of air sucked into said combustion chamber in the current cycle.

8. A control system of an internal combustion engine as set forth in claim 7, wherein the amount of air sucked into said combustion chamber in the current cycle calculated by said second intake air calculating means is corrected based on the difference between the amount of air sucked into said combustion chamber in the previous cycle calculated by said first intake air calculating means and the amount of air sucked into said combustion chamber in the previous cycle calculated by said second intake air calculating means so as to calculate the amount of air sucked into said combustion chamber in the current cycle.

9. A control system of an internal combustion engine as set forth in claim 8 wherein, when the difference between the amount of air sucked into said combustion chamber in the previous cycle calculated by said first intake air calculating means and the amount of air sucked into said combustion chamber in the previous cycle calculated by said second intake air calculating means is a predetermined value or more, correcting the amount of air sucked into said combustion chamber in the current cycle calculated by said second intake air calculating means based on said difference so as to calculate the amount of air sucked into said combustion chamber in the current cycle, is prohibited.

10. A control system of an internal combustion engine as set forth in claim 1, wherein said gas passage effective area is calculated based on lift amounts of the intake valve and exhaust valve during said valve overlap and the engine speed during said valve overlap.

11. A control method of an internal combustion engine having a valve mechanism able to change a valve opening characteristic of at least one of an intake valve and exhaust valve and burning an air-fuel mixture comprised of fuel and air inside a combustion chamber to generate power, characterized by calculating the amount of air sucked into the combustion chamber based on an intake air pressure during valve overlap between said intake valve and said exhaust valve, an exhaust gas pressure during valve overlap, a cylinder pressure at said combustion chamber during a compression stroke of said internal combustion engine, and a gas passage effective area during said valve overlap.

* * * * *